(12) United States Patent
Somech et al.

(10) Patent No.: US 8,498,916 B2
(45) Date of Patent: *Jul. 30, 2013

(54) DEVICE, SYSTEM, AND METHOD OF AUTOMATIC FINANCIAL-INSTRUMENT MANAGEMENT

(75) Inventors: Samuel Somech, Ramat Gan (IL); Menachem Ahikam Oron, Modiin (IL); David Gershon, Tel Aviv (IL)

(73) Assignee: Super Derivatives, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/281,464

(22) Filed: Oct. 26, 2011

(65) Prior Publication Data

US 2012/0041895 A1 Feb. 16, 2012

Related U.S. Application Data

(63) Continuation of application No. 12/472,051, filed on May 26, 2009, now Pat. No. 8,073,760.

(60) Provisional application No. 61/056,026, filed on May 26, 2008.

(51) Int. Cl.
  *G06Q 40/00* (2012.01)
(52) U.S. Cl.
  USPC ........................................................ 705/36 R
(58) Field of Classification Search
  USPC ................. 705/35–37; 707/999.001–999.206
  See application file for complete search history.

(56) References Cited

U.S. PATENT DOCUMENTS

| | | | |
|---|---|---|---|
| 7,373,324 B1* | 5/2008 | Engin et al. | 705/36 R |
| 8,073,760 B2 | 12/2011 | Somech et al. | |
| 2006/0277124 A1 | 12/2006 | Gerrietts, II | |
| 2008/0027847 A1 | 1/2008 | Masucci | |
| 2008/0059382 A1 | 3/2008 | Burczyk | |
| 2008/0097892 A1* | 4/2008 | Yohai-Giochais | 705/37 |

OTHER PUBLICATIONS

International Search Report and Written Opinion for PCT application PCT/IL09/00521 mailed on Sep. 3, 2009; 12 pages.
Non-final Office action dated Dec. 30, 2010 for U.S. Appl. No. 12/472,051; 11 pages.
Final Office action dated May 18, 2011 for U.S. Appl. No. 12/472,051; 9 pages.

(Continued)

*Primary Examiner* — Mary Cheung
(74) *Attorney, Agent, or Firm* — Shichrur & Co.

(57) ABSTRACT

Devices, systems, and methods of automatic Financial-Instrument (FI) management. In some embodiments, a system includes, a memory having stored thereon financial-instrument-based (FI-based) management instructions; and a processor to execute the FI-based management instructions resulting in a FI-based management application, wherein the FI-based management application may receive portfolio data corresponding to a plurality of financial-instrument portfolios associated with a plurality of clients, wherein the FI-based management application may automatically identify one or more portfolios of the plurality of portfolios satisfying at least one criterion, wherein, for each identified portfolio, the FI-based management application may receive client-specific management data corresponding to a client associated with the identified portfolio, wherein the client-specific management data includes at least client-specific destination information defining at least one destination, and wherein, for each identified portfolio, the FI-based management application may automatically communicate portfolio-related data corresponding to the identified portfolio to the destination defined by the management data.

18 Claims, 4 Drawing Sheets

OTHER PUBLICATIONS

Search Report for European patent application 09754335.9 mailed on Dec. 6, 2012; 6 pages.

EPO: "Notice from the European Patent Office dated Oct. 1, 2007 concerning business methods", Official Journal of the European Patent Office, EPO, Munchen, DE, vol. 30, No. 11, Nov. 1, 2007, pp. 592-593.

EPO: "Examination of computer implemented inventions at the European Patent Office with particular attention to computer-implemented business methods", Official Journal of the European Patent Office, EPO, Munchen, DE, vol. 30, No. 11, Nov. 1, 2007, pp. 594-597.

International Preliminary Report on Patentability for PCT application PCT/IL09/00521 mailed on Dec. 9, 2010; 6 pages.

\* cited by examiner

DEVICE, SYSTEM, AND METHOD OF AUTOMATIC FINANCIAL-INSTRUMENT MANAGEMENT

CROSS REFERENCE

This application is a Continuation Application of U.S. patent application Ser. No. 12/472,051, filed May 26, 2009, which claims the benefit of, and priority from, U.S. Provisional Patent application 61/056,026, entitled "Device, system, and method of financial-instrument-based customer-relationship-management", filed May 26, 2008, the entire disclosures of which are incorporated herein by reference.

FIELD

Some embodiments relate generally to the field of financial instruments and, more particularly, to automatic Financial Instrument (FI) management.

BACKGROUND

Financial instruments can be categorized by form depending, for example, on whether they are cash instruments or derivative instruments. Cash instruments are financial instruments whose value is determined directly by markets. Derivative instruments are financial instruments, which derive their value from some other instrument or variable. Financial instruments can also be divided into exchange-traded derivatives and over-the-counter (OTC) derivatives.

Sales and trading of financial instruments are sometimes a very profitable area of investment banking, responsible for a large part of revenue for many financial institutions such as banks or brokers.

In the process of market making, 'traders' (trading desk) will buy and sell financial products with the goal of making an incremental amount of money on each trade.

A sales force, e.g., a Bank's or broker's sales force, may call on 'clients', such as institutional and high-net-worth investors or corporations who need to hedge their risks, to suggest possible trades and take orders. The term 'Structuring' may relate to the creation of complex financial products, which embed derivatives, and as such typically may offer much greater margins and returns than underlying cash securities. Bank/broker Sales and structuring desks (commonly referred to as 'Sales') may then communicate their clients' orders to the appropriate 'trading desks' who can price and execute trades, or structure new products that fit a specific need.

Customer Relationship Management (CRM) is a systematic approach towards using information and ongoing dialogue to build long lasting mutually beneficial customer relationship. CRM may include a collaborative system of business practices implemented across an enterprise to organize the acquisition, aggregation, and/or analysis of customer profiles.

CRM services may allow sharing customer information across the company in order to create a customer-centric organization.

SUMMARY

Some embodiments include, for example, devices, systems, and methods of automatic Financial-Instrument (FI) management, for example, client-specific FI-based managements, e.g., integrated FI-based Client-Relationship-Management (CRM).

Some embodiments include a system including a memory having stored thereon financial-instrument-based (FI-based) management instructions; and a processor to execute the FI-based management instructions resulting in a FI-based management application, wherein the FI-based management application is to receive portfolio data corresponding to a plurality of financial-instrument (FI) portfolios associated with a plurality of clients, wherein the FI-based management application is to automatically identify one or more portfolios of the plurality of portfolios satisfying at least one criterion, wherein, for each identified portfolio, the FI-based management application is to receive client-specific management data corresponding to a client associated with the identified portfolio, wherein the client-specific management data includes at least client-specific destination information defining at least one destination, and wherein, for each identified portfolio, the FI-based management application is to automatically communicate portfolio-related data corresponding to the identified portfolio to the destination defined by the client-specific management data.

In some embodiments, in identifying the one or more portfolios the FI-based management application is to automatically identify one or more portfolios including at least one financial instrument having an event satisfying a predefined event-based criterion.

In some embodiments, the portfolio data includes at least information of the event.

In some embodiments, the event-based criterion relates to at least one of an expiration of the financial instrument or a barrier of the financial instrument.

In some embodiments, the FI-based management application is to receive trade parameters defining a trade; and to automatically identify the one or more identified portfolios based on a criterion related to the trade parameters.

In some embodiments, the FI-based management application is to automatically generate a client-specific trade article corresponding to the trade based on client specific information corresponding to the client associated with the identified portfolio; and to automatically communicate the client-specific trade article to the destination defined by the client-specific management data.

In some embodiments, the FI-based management application is to determine one or more recommended trades corresponding to the identified portfolio, wherein the portfolio-related data corresponding to the identified portfolio includes recommendation information relating to the one or more recommended trades.

In some embodiments, the recommended trades include at least one trade corresponding to a financial instrument included in the portfolio.

In some embodiments, the recommended trades include at least one trade corresponding to a financial instrument to be added to the portfolio.

In some embodiments, the FI-based management application is to identify one or more portfolios, which do not hedge currency exposure and a corresponding interest-rate exposure, and wherein the recommended trades include a trade to hedge the unhedged exposure.

In some embodiments, the FI-based management application is to automatically determine a client-specific profile corresponding to at least one client of the plurality of clients based on one or more portfolios of the plurality of portfolios associated with the at least one client, wherein the FI-based management application is to automatically determine one or more client-specific parameters of a trade to be offered to the at least one client based on the client profile.

In some embodiments, the client specific parameters include a sales margin.

In some embodiments, the FI-based management application is to receive real-time market data corresponding to the plurality of portfolios and to automatically identify the one or more portfolios based on the real-time market data.

In some embodiments, the FI-based management application is to define the criterion based on one or more user-defined parameters.

Some embodiments include a system including a memory having stored thereon financial-instrument-based management instructions; and a processor to execute the FI-based management instructions resulting in a FI-based management application, wherein the FI-based management application is to receive trade parameters data defining at least one trade with respect to a financial instrument, and client-specific data corresponding to a plurality of clients, wherein the FI-based management application is to automatically define at least one recommended client-specific trade be offered to at least one respective client of the plurality of clients, based on the trade parameters and the client-specific data corresponding to the client, and wherein the FI-based management application is to automatically provide an output corresponding to the recommended client-specific transaction.

In some embodiments, the client-specific data corresponding to each client includes financial data corresponding to the client.

In some embodiments, the financial data includes at least one of portfolio data corresponding to one or more portfolios associated with the client, and client profile data defining a financial-instrument related profile of the client.

In some embodiments, the FI-based management application is to receive client-specific management data corresponding to the client, wherein the client-specific management data includes at least client-specific destination information defining at least one destination, wherein the FI-based management application is to automatically communicate recommendation information relating to the recommended trade to the destination defined by the client-specific management data.

In some embodiments, the FI-based management application is to automatically generate a client-specific trade article corresponding to the recommended trade based on client specific information corresponding to the client; and to automatically communicate the client-specific trade article to the destination defined by the client-specific management data.

Some embodiments include a computer-based method including receiving by a computing device portfolio data corresponding to a plurality of FI portfolios associated with a plurality of clients; automatically identifying by the computing device one or more portfolios of the plurality of portfolios satisfying at least one criterion; for each identified portfolio, receiving by the computing device client-specific management data corresponding to a client associated with the identified portfolio, wherein the client-specific management data includes at least client-specific destination information defining at least one destination; and for each identified portfolio, automatically communicating from portfolio-related data corresponding to the identified portfolio from the computing device to the destination defined by the client-specific management data.

In some embodiments, identifying the one or more portfolios includes automatically identifying one or more portfolios including at least one financial instrument having an event satisfying a predefined event-based criterion.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
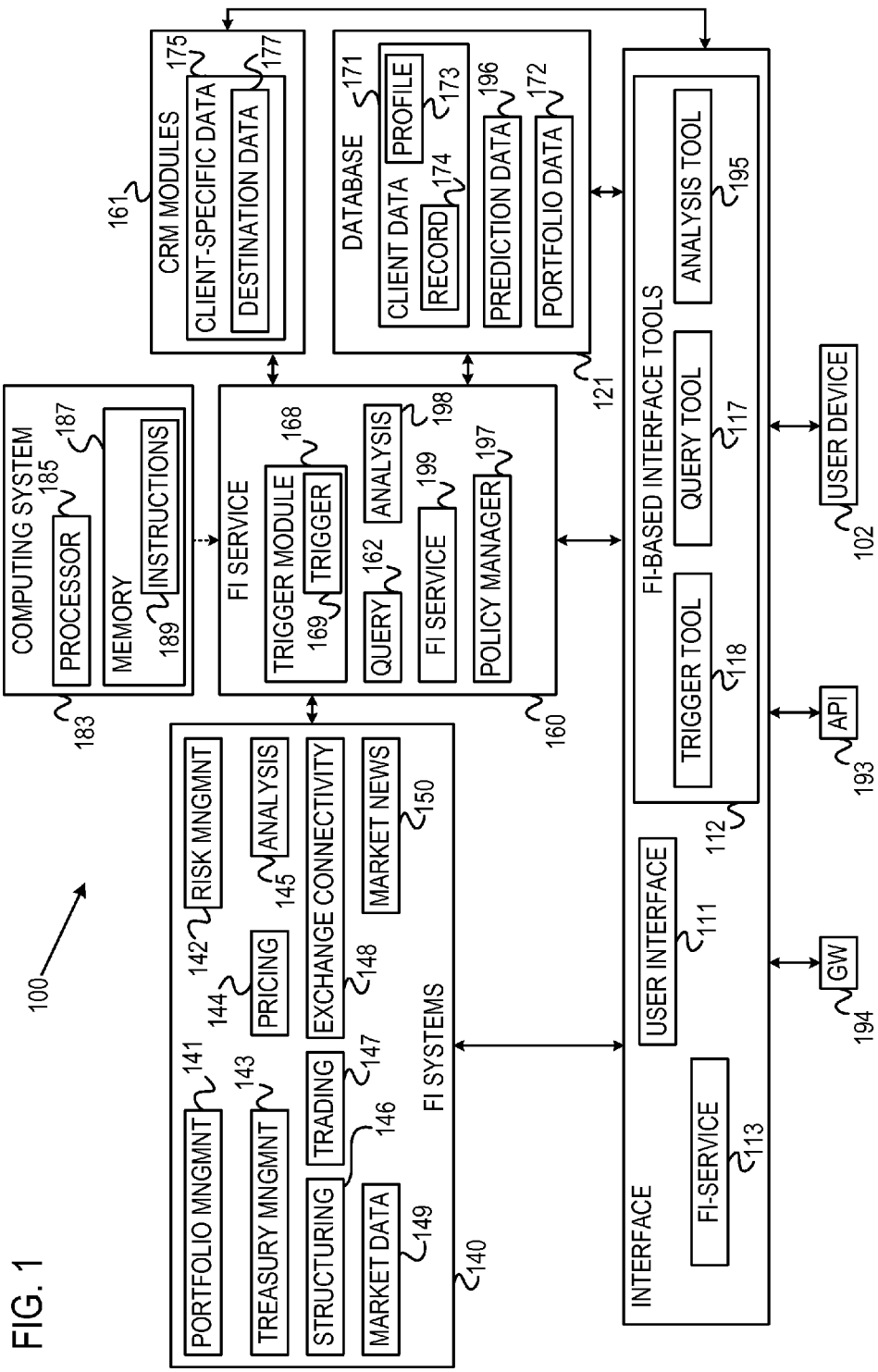
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some portions of the following detailed description are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

Some embodiments may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), Wi-Fi, Wi-Max, ZigBee™, Global System for Mobile communication (GSM), 2G, 2.5G, 3G, 3.5G, or the like. Some embodiments may be used in various other devices, systems and/or networks.

Some demonstrative embodiments are described herein in the context of automatically performing one or more operations, for example, management operations, for example, client-specific management operations, e.g., Customer-Relationship-Management (CRM) operations, based on a derivative instrument, e.g., a stock option. It should be appreciated, however, that some embodiments may be applied to other financial instruments (FIs) and/or markets, and that embodiments are not limited to stock options. Some embodiments may be applied to other options and/or option-like financial instruments, e.g., options on interest rate futures, options on commodities, and/or options on non-asset instruments, such as options on the weather, and the like, with variation as may be necessary to adapt for factors unique to a given financial instrument.

Some demonstrative embodiments are described herein in the context of performing one or more client-specific management operations, e.g., CRM operations. However, it should be appreciated that other embodiments may include performing any other suitable management or non-management operations, e.g., Data Warehousing, Data Analysis, Data Mining, CRM Analytics, Business-Intelligence (BI) operations, Enterprise Resource Planning (ERP) operations, and the like.

Some demonstrative embodiments may be implemented by, for and/or with relation to any suitable financial institute, e.g., a bank, broker, and/or organization, which may be involved with some aspect of financial instrument trading and/or processing.

Reference is now made to FIG. 1, which schematically illustrates a block diagram of a system 100 in accordance with some demonstrative embodiments.

In some embodiments, system 100 includes one or more user stations or devices 102, for example, a PC, a laptop computer, a PDA device, and/or a terminal, that allow one or more users to structure, price, analyze and/or perform one or more operations or transactions (also referred to as "trades") of one or more financial instruments, structures or products ("financial instruments"); and to automatically perform one or more Financial-Instrument (FI) based management operations, e.g., FI-based CRM operations, corresponding to the transactions, e.g., as described herein. The transaction may include a trading transaction between a client and either an institute implementing system 100, e.g., a bank, or any other suitable client/third party, an exchange, an electronic communication network (ECN) or any other suitable marketplace. In such cases the institution may serve an intermediary or broker.

The term "financial instrument" may refer to any suitable "asset class", e.g., Foreign Exchange (FX), Interest Rate, Equity, Commodities, Credit, weather, energy, real estate, mortgages, and the like; and/or may involve more than one asset class, e.g., cross-asset, multi asset, and the like. The term "financial instrument" may refer to both cash instruments, e.g., securities, loans, deposits and bonds, as well as derivative instruments, e.g., forwards, swaps, futures, exchange options and OTC options, which derive their value from the value and characteristics of one or more underlying assets. The term "financial instrument" may also refer to a combination of one or more financial instruments.

Some demonstrative embodiments are described herein in the context of purchasing, buying offering a client to buy, and/or recommending to a client to buy a financial instrument. However, it should be appreciated that other embodiments may include performing any one or more suitable transaction-related operations with relation to one or more financial instruments, for example, selling a financial instrument, offering a client to sell a financial instrument, recommending to a client to sell a financial instrument, and/or performing any suitable combination of selling and/or buying operations with respect to one or more financial instruments, e.g., selling a first financial instrument and buying a second financial instrument, as part of any suitable strategy.

The user of device 102 may include, for example, a business analyst, a corporate structuring manager, a salesperson, a trader, a risk manager, a front office manager, a back office, a middle office, a system administrator, and the like.

In some embodiments, devices 102 may be implemented using suitable hardware components and/or software components, for example, processors, controllers, memory units, storage units, input units, output units, communication units, operating systems, applications, or the like.

In some embodiments, system 100 may include a FI-based management application or service (hereinafter "FI-based management application") 160 capable of providing to users 102 one or more FI-based management services and/or capabilities, e.g., CRM services, as described in detail below.

In some embodiments, system 100 may also include an interface 110 to interface between users 102 and one or more elements of system 100, e.g., FI-based management application 160. Interface 110 may optionally interface between users 102 and one or more FI systems and/or services 140. Services 140 may include, for example, one or more portfolio management systems 141, one or more risk management systems 142, one or more treasury management systems 143, one or more pricing services 144, one or more analysis services 145, one or more structuring services 146, one or more trading systems 147, one or more exchange connectivity systems 148, one or more market data systems 149, one or more market news services 159 and/or one or more other suitable FI-related services, systems and/or platforms. Additionally or alternatively, interface 110 may interface between users 102 and any suitable CRM modules or systems (hereinafter "CRM modules") 161.

In some embodiments, CRM modules 161 may provide the users of system 100 with any suitable CRM services and/or capabilities, e.g., including but not limited to one or more of the following CRM capabilities and/or services:

Interest management, e.g., working with cold contacts, interest qualification and their transference to opportunities, and the like;

Contacts/counteragents management, e.g., information about counteragents and relationships management, access to part of the information or the whole information about counteragents, relationships management, relationship history, calendar and all means of communication, including telephone, fax and e-mail, and the like;

Email synchronization;

Reporting, e.g., sales prognosis, tendency definition, activity analysis and effectiveness of sales department, and the like;

Opportunity management, e.g., potential client's qualification, potential sales following according to the stages of selling, and the like;

Offers, orders and invoices management, e.g., orders, offers and invoices formation with product catalogue application, and the like;

Sales planning, e.g., opportunity to compare each employee's sales to his/her personal plan of sales, and the like;

Personal mailing, e.g., mailing for a great number of people on the basis of personally-defined patterns, and the like; and/or Any other suitable CRM related operation or service.

In some embodiments, FI-based management application 160 may be capable of communicating, directly or indirectly, e.g., via interface 110 and/or any other interface, with one or more suitable modules of system 100, for example, one or more of FI systems 140, CRM modules or systems 161, an archive, an E-mail service, an HTTP service, an FTP service, an application, and/or any suitable module capable of providing, e.g., automatically, input to FI-based management application 160 and/or receiving output generated by FI-based management application 160, e.g., as described herein.

In some embodiments, FI-based management application 160 may be implemented as part of FI systems/services 140, as part of CRM modules 161 and/or as part of any other suitable system or module, e.g., as part of any suitable server, or as a dedicated server.

In some embodiments, FI-based management application 160 may include a local or remote application executed by any suitable computing system 183. For example, computing system 183 may include a suitable memory 187 having stored thereon FI-based management application instructions 189; and a suitable processor 185 to execute instructions 189 resulting in FI-based management application 160. In some embodiments, computing system 183 may include a server to provide the functionality of FI-based management application 160 to users 112. In other embodiments, computing system 183 may be part of user station 102. For example, instructions 189 may be downloaded and/or received by users 102 from another computing system, such that FI-based management application 160 may be executed locally by users 102. For example, instructions 189 may be received and stored, e.g., temporarily, in a memory or any suitable short-term memory or buffer of user device 102, e.g., prior to being executed by a processor of user device 102. In other embodiments, computing system 183 may include any other suitable computing arrangement and/or scheme.

In some embodiments, computing system 183 may also execute one or more of FI systems/services 140 and/or CRM modules 161. In other embodiments, FI-based management application 160 may be implemented separately from one or more of FI systems/services 140 and/or CRM modules 161.

In some embodiments, interface 110 may be implemented as part of FI-based management application 160, FI systems/services 140, CRM modules 161 and/or as part of any other suitable system or module, e.g., as part of any suitable server.

In some embodiments, interface 110 may be associated with and/or included as part of devices 102. In one example, interface 110 may be implemented, for example, as middleware, as part of any suitable application, and/or as part of a server. Interface 110 may be implemented using any suitable hardware components and/or software components, for example, processors, controllers, memory units, storage units, input units, output units, communication units, operating systems, applications. In some embodiments, interface 110 may include, or may be part of a Web-based structuring/pricing application, a web-site, a web-page, a stand-alone application, a plug-in, an ActiveX control, a rich content component (e.g., a Flash or Shockwave component), or the like.

In some embodiments, interface 110 may also interface between users 102 and one or more of FI systems and/or services 140, management application 160, a database 121, and/or CRM modules 161, e.g., as described below.

In some embodiments, interface 110 may be configured to allow users 102 to enter commands; to define a financial instrument; to define and/or structure a trade corresponding to the financial instrument; to receive a pricing of the trade; to analyze the trade; to transact the trade; to analyze and generate reports about a portfolio of financial instruments held by the user or a client; to analyze any market information such as prices, trends, risk measures and the like; to monitor one or more trades and/or portfolios; and/or to otherwise control and/or analyze the user's structuring/pricing operations, e.g., as described below. In some embodiments, users 102 may indirectly interact with one or more of FI systems and/or services 140, for example, via communication with CRM modules 161, to enter commands; to define a financial instrument; to define and/or structure a trade corresponding to the financial instrument; to receive a pricing of the trade; to analyze the trade; to transact the trade; to monitor a trade or a portfolio; and/or to otherwise control and/or analyze the user's structuring/pricing operations, e.g., as described below.

In some embodiments, interface 110 may include one or more of FI systems/services 140 and/or one or more other FI services 113.

In some embodiments, interface 110 may interface FI systems 140, FI management application 160, database 121, and/or CRM modules 161, with one or more other modules and/or devices, for example, a gateway 194 and/or an application programming interface (API) 193, for example, to transfer information from FI-based management application 160 and/or CRM modules 161 to one or more other, e.g., internal or external, parties, users, applications and/or systems, e.g., one or more clients, using any suitable communication method, e.g., E-mail, Fax, SMS, Twitter, a website, an the like.

In some embodiments, FI-based management application 160 may be capable of automatically performing one or more FI-based management operations, for example, client-specific operations with relation to one or more trades, based on client-specific information corresponding to one or more clients, e.g., as described in detail below.

In some embodiments, FI-based management application 160 may be capable of automatically providing the users of system 100 with FI-based management and/or CRM capabilities and/or services, e.g., as described herein. For example, FI-based management application 160 may automatically integrate between FI systems 140 and one or more CRM modules 161, to support workflow and/or and productivity of sales, trade, and/or management people within a financial institute, e.g., a bank or broker, as described herein.

In a non-limiting example, the services provided by FI-management application 160 may increase revenue, client loyalty, sales morale and/or overall profitability of the financial institute. Additionally or alternatively, the services provided by FI-management application 160 may increase management effectiveness and/or reduce operating costs and/or various types of risks, e.g., operational, market, counterparty and/or compliance risks.

In one example, application 160 may be implemented, e.g., by the financial institute, to provide users 102, e.g., a sales person, with FI-based management and/or CRM capabilities, e.g., as described herein, allowing the sales person, for example, to easily interact with a client towards addressing the client's needs and/or the sales-person's/institution's goals with respect to one or more financial instruments.

In one implementation, application 160 may be used by the sales person to follow a financial product, e.g., a trade, and/or to interact with at least one client, for example, after offering, providing and/or selling the financial product to the client based, for example, on a current and/or past portfolio of one or more financial instruments associated with the client, a profile associated with the client, client-specific management information associated with the client, expected changes in the portfolio and/or market exposures, the client's past executed transactions, overall financial market trends, and/or data corresponding to the financial product, e.g., as described in detail below.

Additionally or alternatively, application 160 may be used by users 102, e.g., the sales person, prior to offering, providing and/or selling the financial product to the client based, for example, on a current and/or past portfolio of one or more financial instruments associated with the client, a profile associated with the client, clients-specific management information associated with the client, expected changes in the portfolio and/or market exposures, the client's past executed transactions, overall financial market trends, and/or data corresponding to the financial product, e.g., as described in detail below.

Additionally or alternatively, application 160 may perform one or more operations to automatically alert users 102, a client, and/or a financial institute, that one or more predefined rules are satisfied with relation to a financial product held by the client or financial institute, e.g., rules relating to an event corresponding to the financial product, as described in detail below. For example, application 160 may automatically notify and/or alerts user 102, e.g., a sales person, of one or more events, e.g., upcoming expirations, approaching or crosses knock in or knock out prices, and the like, corresponding to portfolios of clients managed by the salesperson, e.g., as described below.

In some embodiments, interface 110 may be adapted to allow user 102 to interact with CRM modules 161, FI-based CRM 160, and/or FI services 140, for example, to perform one or more operations, for example, FI-based management operations, e.g., CRM-related operations. In one example, interface 110 includes one or more FI-based management interface tools 112, for example, one or more query interface tools 117, trigger management interface tools 118 and/or analysis interface tools 195, and/or any other suitable interface tools, as described herein, to allow the user to interface application 160 for performing one or more FI-based management operations, for example, to define one or more trades, to define one or more triggers, queries and/or other operations corresponding to portfolios; and/or to otherwise control, define and/or analyze the FI-based CRM operations.

In some embodiments, application 160 may be capable of providing the users of system 100, e.g., sales department employees, with the capabilities of following the relationship with a client, e.g., through one or more stages of a financial instrument selling process, for example, from first interest identification, through order placement and invoice setting, and up to monitoring the portfolios of the clients, and offering to the clients one or more recommended additional or alternative financial instrument trades.

In some embodiments, application 160 may interact with CRM modules 161, for example, to receive CRM data from CRM modules 161, to run a query, to run an analysis, to cause CRM modules 161 to perform one or more operations, to generate and/or update CRM data and/or suitable CRM records maintained by CRM modules 161, to generate one or more CRM alerts or triggers for CRM modules 161, and/or to use one or more of the capabilities of CRM modules, e.g., as described herein.

In some embodiments, FI-based management application 160 may be implemented as part of CRM modules 161, e.g., as an application and/or service provided by CRM modules 161 or as part of FI module 140. In other embodiments, FI-based management application 160 may be implemented independently of CRM modules, e.g., as a high level module and/or a stand-alone service or application.

In some embodiments, application 160 may automatically generate, modify and/or update one or more CRM events, alerts or triggers in a suitable format handled by CRM modules 161, e.g., to activate a suitable CRM event, alert or trigger based on information received from FI systems 140 and/or users 102, e.g., as described in detail below.

In some embodiments, system 100 may also include database 121, e.g., associated with interface 110, FI-based CRM service 121, CRM modules 161 and/or FI systems 140, to maintain, for example, any suitable client data 171 corresponding to one or more clients of the financial institute; and/or any suitable portfolio data 172 corresponding to one or more portfolios belonging to the clients. For example, for each portfolio, the portfolio data 172 may include, for example, any suitable details of one or more current financial instruments currently included in the portfolio. For example, the details corresponding to a financial instrument may include, for example, an instrument type and any suitable, e.g. full, contractual definitions of the financial instrument may include, for example, one or more underlying assets, amount, strike price, expiration date, knock-in price, knock-out price, and the like. Client data 171 may include one or more client profiles 173 corresponding to one or more clients. Client profile 173 may include, for example, information that characterizes the trading activity of an institution or an individual in the institution. Client profile 173 may include any suitable client-specific profile information corresponding to a client, e.g., based on the portfolio of the client, historical financial instruments previously included in the portfolio, previous financial products offered to the client, previous financial products sold to the client, a risk limit of the client, and the like. In one example, client profile 173 may include one or more of the following information and/or parameters:

Currencies, country of interest rates, commodities, stocks and/or any other asset of an interest to the client. For example, a UK client may be interested in British Pound (GBP)/Euro (EUR), GBP/US dollar (USD), GBP/Japanese Yen (JPY), GBP rate, USD rates, diesel, UK electricity, the stock of the company that trades in the London stock exchange, and the like.

Natural direction (long/short) of the use in each asset that is a result of its business activity. For example, if the UK client is an exporter, which receives EUR, USD and JPY, and has debt in GBP and USD and pays GBP and USD interest rates, consumes diesel and electricity, and is compensated based on the performance of its stock.

The nature of activity of the institution/user. For example, a corporation that does financial derivatives for hedging, hedge funds that use financial derivatives for speculation, a broker that offers structures to non professional clients, and the like.

The structure that the client likes to use for the financial activity. For example, in currencies the client may be willing to use simple exotic options like knock out to hedge the rates of GBP/EUR, GBP/USD, GBP/JPY; in interest rates the client may only use simple swaps, swaptions and caps/floors; in diesel the client may only use vanilla options and swaps, and not options in any other asset.

The frequency that the client trades, e.g. whether hedges once a month, once a quarter or does adjustments on a daily basis.

The size/order of magnitude of trades that the client has to do, e.g., GBP 200-300 m against USD and EUR, GBP 50 m against JPY, 100 m of debt in USD, 200 m debt in GBO, about 5,000 liters of diesel per month.

The level of involvement of the user/organization in the financial instruments activity, e.g., does the client look at the profits/losses on a daily basis or only on a monthly basis/quarterly basis, is there always someone in the office to get messages about events that happen to options such as knock out/in, is the client interested to hear ideas to improve hedging regularly or only toward the hedging activity.

The risk profile of the organization and the willingness to spend money on financial products, e.g., what % of the client's exposure needs to be hedged, is there a budget to spend on hedging or is it preferred to do zero cost structures while reducing potential income from the hedging.

The hierarchy of people in the finance department and their level of authority in executing trades, e.g., who makes the decision about which traders to do, who recommends what traders to do, who deals with the day to day activity of trades that were done already, is the board of directors of the company involved in the decision how and what to hedge.

time from first client interaction;
time from last client transaction;
general transaction history;
volume of deals (overall, past year);
client profitability (overall, past year);
client potential;
'hit ratio' (what percentage of offers he accepted);
overall support resources invested;
client investment/hedging goals;
client's counterparty risk;
organization's profitability ranking;
client's exposures and hedging policy per asset type;
client's risk-tolerance profile;
client's authorized trades;
client's past transactions—quantitative, e.g., average size, number, overall notional, overall premium, and the like;
client's past transactions—type, e.g., asset class, instrument type, buy/sell, risk metrics, and the like;
any other parameter.

Client profile 173 corresponding to a client may be automatically generated, modified and/or updated, for example, by application 160, e.g., based on information received from FI systems 140, CRM modules 161, user 102, interface 110 and/or database 121.

In some embodiments, application 160 may include an analysis module 198 capable of performing "Client Behavior Analysis" to perform, for example, predictive analysis based, for example, on the client's record 174 of relevant activities and events ("the client's record") recorded, e.g., as part of profile 173, in database 121, FI services 140, CRM modules 161, application 160, and/or received from other services and/or systems, e.g., via gateway 194 and/or API 19. The client's record 174 may include, for example, information related to transactions previously offered to the client, transactions performed or declined by the client; various statistics and aggregations related to the client's current and past trading activity such as, for example, the client's investment or hedging goals, underlying asset class or instrument types; various post-trade expected events related to the client's portfolio such as, for example, option expiries; client data 171; profile data 173; portfolio data 172; and/or any other suitable information related to the client and/or the activity of the client.

In some embodiments, analysis module 198 may be capable of automatically generating predictive data corresponding to the client, for example, any suitable "pattern" data representing a behavioral pattern of the client with respect to FI transactions, e.g., a percent of first offers accepted by the client, a percent of offers declined by the client, and the like. Additionally or alternatively, analysis module 198 may be capable of automatically generating predictive data corresponding to a selected group of clients, for example, any suitable "pattern" data representing a behavioral pattern of the group of clients with respect to one or more FI trades, e.g., a group of clients having in their portfolios a one or more specific FIs. Application 160 may be capable of storing in database 121 prediction data 196 including the prediction data generated by analysis module 198.

In some embodiments, tools 112 may include, for example, an analysis interface tool 195 to allow users 102 to define parameters and/or rules to be applied by analysis module 198 for generating prediction data 196. For example, analysis tool 195 may allow defining the type, amount and/or origin of data to be used by analysis module 198, the analysis to be performed, the type and/or format of prediction data to be generated, and the like.

In some embodiments, application 160 may include a trigger module 168 capable of generating one or more triggers 169 based on portfolio data 172 and/or FI-related information received from FI services 140. In one example, the triggers 169 may include Sales-Person Relevant Triggers (SRTs), which may be deduced by application 160 based on the FI information received from systems 140, e.g., as described below.

In some embodiments, the triggers 169 generated by trigger module 168 may include information items, which may be provided to the user or the client, e.g., a sales person, via, for example, interface 110, and may indicate, alert, notify and/or imply that the user, e.g., the sales person, should take suitable action, e.g., with relation to one or more transactions, portfolios and/or clients, in order to achieve one or more predefined goals including, e.g., the sales person's goals, the institution's goals, and/or the client's goals.

In some embodiments, trigger module 168 may provide the triggers 169 directly to CRM modules 161. For example, application 160 may generate triggers 169 in a format suitable for CRM modules 161, e.g., in the format of a CRM alert or CRM trigger, to activate a suitable CRM event of modules 161.

In some embodiments, trigger module 168 may define the triggers 169 with relation to any one or more suitable parameters corresponding to one or more financial instruments ("the trigger parameters"). For example, trigger module 169 may define the triggers with relation to one or more parameters, e.g., as defined by user 102 via interface 112, corresponding to one or more client portfolios managed by the sales person, e.g., based on client data 171, profiles 173, and/or portfolio data 172, as described below.

In some embodiments, application 160 may be capable of automatically generating and sending to a user or a client a communication, e.g., via gateway 194 and/or API 193, and/or causing CRM modules 161 to send the communication, including any suitable portfolio-related information, CRM and/or FI related information based on the triggers 169 and/or prediction data 196, as described herein. In some embodiments, application 160 may also include one or more FI services 199, for example, one or more CRM-related FI services and/or one or more client-customizable FI services. In one example, FI services 199 and/or 113 may include a customized trade-article service, e.g., as described by U.S. patent application Ser. No. 12/357,463, filed Jan. 22, 2009, entitled "Device, system, and method of generating a customized trade article", the entire disclosure of which is incorporated herein by reference. For example, based on triggers 169, application 160 may automatically generate a customized trade idea; and send to the user and/or client, or cause CRM modules 161 to send to the user and/or client, a customized trade article, e.g., a trade idea, e.g., as part of an E-mail communication, which may be addressed to an E-mail associated with the client, as may be retrieved from client data 171 and/or CRM modules 161.

In one example, trigger 169 may include a client-specific trigger, e.g., corresponding to a specific client, e.g., based on client data 171. In another example, trigger 169 may include a client-group trigger, e.g., corresponding to a group of clients, e.g., based on client data 171. For example, trigger 169 may correspond to a financial instrument, e.g., a specific type of option, held by a group of the clients. In a further example, trigger 169 may include a portfolio-specific trigger, e.g., corresponding to a specific portfolio, e.g., based on portfolio data 172. In yet a further example, trigger 169 may include a portfolio-group trigger, e.g., corresponding to a group of portfolios of one or more clients, e.g., based on client data 171 and/or portfolio data 172.

In some non-limiting example, triggers 169 may be based on one or more of the following trigger parameters, which may be defined, e.g., individually and/or jointly, for one or more clients, transaction and/or portfolios managed by the sales person:

One or more predefined upcoming derivatives lifecycle events in the client's portfolio such as, for example, hitting a barrier (knock-in, knock-out), option expiry, and the like. For example, a trigger 169 corresponding to an option may be generated by application 160 when the price of the option hits a predefined barrier and/or is at a predefined distance from the barrier; a predefined time period, e.g., a predefined number of days, before an expiration date of the option, and the like;

Special price for an option—either specific to the financial institution (e.g. promotion) or via the market. For example, a trigger corresponding to an option may be generated by application 160 when the option reaches a predefined price;

Changes in market parameters, e.g. interest rate, underlying price, which may suggest an opportunity for the client to improve his position relative to his hedging or investment goals. The opportunity is typically implemented by changing the client's position through various possible transactions such as buying or selling options or transactions in the underlying (cash) market;

Change in the underlying exposure (for hedgers);

Price sensitivity simulation (scenario analysis) of the client's portfolio that shows a possibly near term change;

Crossing of a pre-defined risk limit, e.g., too much Delta in the client's portfolio;

Changes in client's goals and/or policies—e.g., a hedger that wishes to be better covered or an investor that seeks more profitability;

"Stop Order" for realizing a profit or limiting a loss by buying or selling options;

Availability of new offerings, e.g., specific structured product or entirely new option class, relevant to the client's goals and/or current portfolio;

Triggers based on new opportunities, changes in environment etc., which conform to the client's expressed "Indication Of Interest" (IOIs). In one example, the client may specify that he would like to be updated any time a new underlying asset (currency pair, stock etc.) is supported for trading. Accordingly, application 160 may monitor systems 140, and generate trigger 169 upon detecting the new underlying asset is supported for trading;

Current or highly possible "credit margin call" related to change in the client's portfolio value (i.e. growth in potential loss);

Overall position keeping or risk-management consideration of the bank that may change the bank's willingness to continue the option contract with the client;

Various calendar events such as holidays, economic announcements or company announcements that may impact the underlying asset (or the option directly); and/or Any other suitable parameters.

Triggers 169 may include one or more group triggers, e.g., triggers commonly defined for a group of one or more clients, transactions and/or portfolios; and/or one or more individual triggers, e.g., triggers individually defined for a specific client, transaction, portfolio and/or a specific subset of a client's portfolio.

Application 160 may operate in tandem with CRM modules 161, for example, to provide the user of devices 102, e.g., the sales person, with triggers 169 in synchronization with and/or as part of CRM services provided by CRM modules 161. For example, if trigger 169 requires the sales person to call the client to discuss a current trade in the portfolio of the client, and/or if trigger 169 requires the sales person to call the client to discuss a possible new trade detected by application 160, then application 160 may cause CRM modules 161 to define a suitable CRM alert to alert the sales person to make the call to the client at a suitable time, including any required information, explanations and/or references, e.g., which may be derived by application 160 from services 140.

Tools 112 may include a trigger definition/update tool 118 to allow one or more predefined users of system 100 to interact with trigger module 168, e.g., define and/or update the parameters of triggers 169. In on example, trigger definition/update tool 118 may allow users 102, e.g., a sales person to define and/or update triggers 169 corresponding to clients, transactions and/or portfolios managed by the sales person. In another example, trigger definition/update tool 118 may allow a client to define and/or update triggers 169 corresponding to one or more portfolios of the client. In one example, access to triggers 169 may be selectively restricted to users of system 100, e.g., the sales person and/or the client, e.g., using a login, a password and the like.

In some embodiments, tools 112 may include a query interface tool 117 to interface a query module 162 at application 160. The user may use query tool 117 to initiate any suitable queries with relation to data from systems 140, e.g., to produce any required FI-based, analysis and/or management information. For example, the sales person may use tool 117 to perform an operation, e.g., similar to the operation of triggers 169, in an ad-hoc and/or user-controlled fashion, e.g., as described below with reference to FIG. 5. In some non-limiting examples, query 162 may result in:

A list of all clients who have been offered an option of a certain type but declined;

A list of all clients who have accepted more than, e.g., 30%, of the offers made to them over the past year;

A list of all clients who have an option of a certain type, e.g., an interest rates option on the USD expiring within a certain time period, e.g., the coming 3 months;

A list of investment clients who have made a certain profit within a certain time period, e.g., clients who have profited more than 40% over the past 3 months;

A list of portfolios according to certain criteria, e.g., the largest 5% portfolios;

A list of portfolios including one or more certain financial instruments, e.g., all portfolios with options on NASDAQ traded instruments;

A list of portfolios including one or more certain types of financial instruments, e.g., all portfolios with energy options;

A list of clients according to any suitable criteria, e.g., all clients who haven't performed a trade over the past 2 months;

One or more lists of clients, portfolios and/or transactions according to any suitable criterion defined by the user, e.g., using query tool 117;

A list of all clients whose goal is to hedge against energy risks; and/or

Any other suitable query or list.

In some embodiments, FI-based management application 160 may also include a policy manager 197 to manage compliance and/or risk policies and/or regulations based on FI information received from FI services 140 and/or information received from CRM modules 161. In one example, the Markets in Financial Instruments Directive (MiFID) may define that some transactions may be offered to only some types of clients. For example, some transactions may be offered to professional clients, and may not be offered to retail clients. In one example, policy manager 197 may enforce compliance with regulations, e.g., the MiFID, to selectively manage offering of a transaction by user 102, e.g., a salesperson, to a client, for example, by determining a status of the client using information from CRM modules 161, database 121, and/or FI services 140. In another example, policy manager 197 enforce compliance with predefined risk policies to selectively manage offering of a transaction by user 102, e.g., a salesperson, to a client, for example, by determining whether or not the client satisfies the predefined risk policies based on information from CRM modules 161, database 121, and/or FI services 140.

In some embodiments, application 160 may be capable of automatically generating relevant FI-based information, knowledge and/or recommendations corresponding to a client's transactions, portfolios, and the like; and inserting the FI-based information, knowledge and/or recommendations as "CRM comments" in a format suitable for CRM modules 161 and/or database 121, e.g., as described herein.

In some embodiments, application 160 may be capable of automatically generating, e.g., based on data received from FI systems 140 and/or CRM modules 161, a performance analysis report per client including direct and/or indirect performance (profit) and/or risk per client. Application 160 may provide the report in a suitable format for CRM modules 161 and/or may store the report in database 121.

In some embodiments, application 160 may automatically generate, e.g., based on data received from FI systems 140 and/or CRM modules 161, a salesperson-based performance analysis report, e.g., including direct and/or indirect performance (profit) and/or risk per client. Application 160 may provide the salesperson-based report in a suitable format for CRM modules 161 and/or may store the salesperson-based report in database 121. The salesperson-based report may be used, for example, for determining per-sales person contribution and/or compensation (commissions).

In one implementation, application 160 may be used by user 102, e.g., the sales person, to follow a financial product, e.g., a transaction, and/or to interact with at least one client, for example, after offering, providing and/or selling the financial product to the client based, for example, on a profile of the client and/or data corresponding to the financial product. In one example, if the sales person has sold an option to a client, then the sales person may use trigger tool 118 to define a trigger 169 corresponding to one or more parameters of the option. For example, if the option includes a knockout option, then the sales person may define trigger 169 to alert the sales person when the price of the option is close to or crosses the knock out. In another example, if the sales person has sold a hedge transaction to a client, then the sales person may use trigger tool 118 to define a trigger 169 corresponding to one or more parameters of the hedge. For example, the sales person may define trigger 169 to alert the sales person upon a predefined change in the underlying exposure, and/or changes in the coverage of the hedge.

In another implementation, application 160 may be used by user 102, e.g., the sales person and/or a trader, prior to offering, providing and/or selling the financial product to the client based, for example, on a profile of the client and/or data corresponding to the financial product.

In one example, application 160 may monitor services 140 and, based on portfolio data 172 corresponding to the client, profile 173 corresponding to the client, prediction data, and/or any other suitable data, application 160 may generate trigger 169 alerting the sales person to offer a recommend financial product customized to the client. In one example, profile 173 corresponding to a client may include a trade hit ratio of the client, e.g., a ratio between a number of trades offered to the client and a number of trades which were actually executed by the client. A low hit ratio may imply, for example, that the offers provided to the client were not suitable for the client and/or were too expensive for the client, e.g., compared to other offers. Accordingly, the sales person may use query tool 117 to query the hit ratio of the client, for example, in order to customize a price of a trade, e.g., to reduce the price of the trade if the hit ratio is low, prior to offering the trade to the client.

In another example, a trader may provide to application 160 trade-parameters defining a trade; application 160 may automatically identify one or more potential clients to be offered the trade; and, based on client-specific information corresponding to the identified clients, application 160 may automatically communicate details regarding the recommended trade, to one or more sales persons in charge of the identified clients.

In another example, policy manager 197 may force user 102, e.g., the salesperson, to comply with regulations and/or risk management policies, e.g., prior to offering a transaction to a client, by allowing user 102 to offer the transaction, for example, only if it is determined, e.g., based on information from FI services 140, database 121, and/or CRM modules 161, that the client complies with regulations, risk management and/or any other entitlement policies, e.g., counterparty credit limit, as described above.

In another implementation, application 160 may perform one or more operations to automatically alert the client, salesperson, trader and/or the financial institute, e.g., based on triggers 169. For example, application 160 may send a message to the client and/or financial institute alerting that one or more predefined rules are satisfied with relation to a financial product, e.g., when an option expires or move in or out of the money. The message may include a cellular message, e.g., a Short Message Service (SMS) message, a Multimedia Message Service (MMS) message, and the like; an electronic mail (E-mail) message, e.g., in accordance with the Simple Mail Transfer Protocol (SMTP), the Hyper Text Transfer Protocol (HTTP), and the like; an Instant Message (IM), an ICQ message, an America-Online Instant Messenger (AIM) message, a Windows Live Messenger (WLM) message, a QQ message, a Skype message, an Extensible Messaging and Presence Protocol (XMPP) message, a Mobile Instant Messaging (MIM) message, an Enterprise Instant Messaging (EIM) message, an IVR message, and the like; and/or an other suitable message type or format.

In some embodiments, application 160 may allow the user to view and/or edit, e.g., using tools 112, one or more client's portfolios and/or data stored by database 121 and/or to access one or more of FI systems 140, e.g., directly within user interface 111.

In some embodiments, application 160 may set up a bi-directional API with CRM modules 161 including a first direction from application 160 to CRM modules 161 to allow, for example, providing triggers 169 and/or transferring portfolio data from application 160 to interface 110, e.g., using the CRM services provided by CRM modules 161; and a second direction from modules 161 to application 160 to allow, for example, transferring queries 162 and/or editing parameters of triggers 169 from interface 110 to application 160, e.g., using the CRM services of modules 161.

In some embodiments, application 160 may use query 162 to perform suitable sales data and/or reporting operations, thereby to allow an individual sales person and/or sales management to directly access information residing in one or more of FI systems 140, CRM modules 161 and/or database 121. For example, application 160 may allow the individual sales person and/or sales management to review the amount the premiums generated, the brokerage paid or the sales-margin (commission) for a specific portfolio, client or any subset of clients.

In some embodiments, application 160 may use query 162 to generate various queries and/or reports based on the information from systems 140, possibly in conjunction with CRM-related data originated by CRM modules 161. For example, management can use query 162 to receive a report of the average number of trades per each sales person, the number of phone calls made per trade, the average bank profitability per sales person, the overall margin generated based on a specific campaign, and the like. Management may use query 162, for example, to track various trends and then fit offering and strategy to those trends.

In some embodiments, application 160 may provide the financial institution with access to lists of existing potential clients (counterparties), e.g. corporate treasurers, asset managers or hedge funds.

In some embodiments, tools 112 may include any suitable communication and/or reporting tools to allow the user, e.g., the sales person, to generate and/or send, e.g., to the client, any suitable report, e.g., mark-to-market, which may be directly generated at application 160 and/or based on the FI information received by application 160 from services 140.

In some embodiments, application 160 and/or modules 161 may be capable of performing any suitable E-mail and/or chat communications with interface 110, e.g., using any suitable security standards and/or encryption.

In some embodiments, tools 112 and/or user interface 111 may also include any suitable customized trade article tools, e.g., as part of FI services 113, and/or interface allowing the sales person to send the client any suitable customized and/or formatted trade idea, e.g., using FI-based management application 160 and/or modules 161.

In some embodiments, application 160 may be capable of distributing news, research, market data, trade offers and/or campaigns, e.g. a special structured product, to a defined subset of clients.

Figure 2:
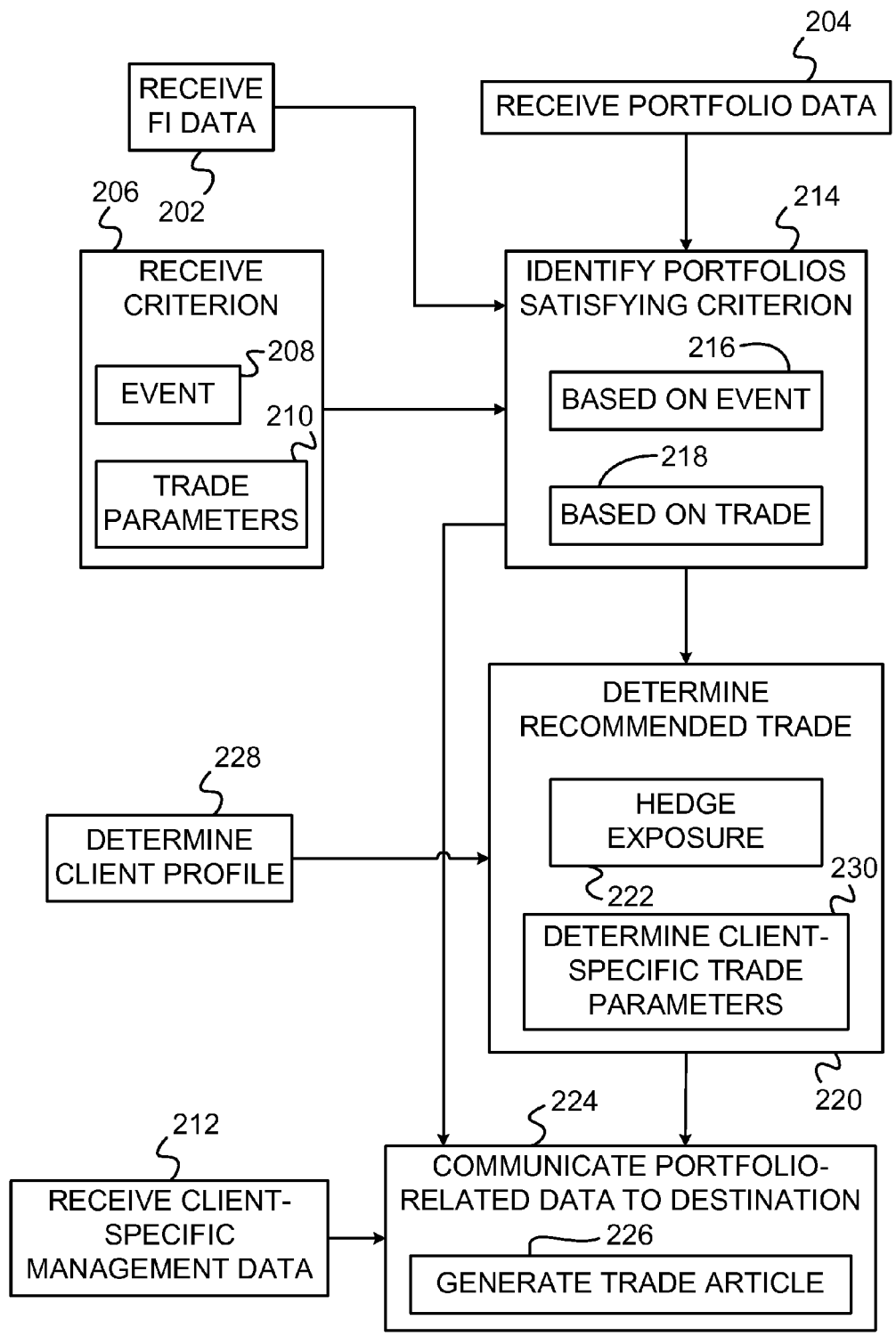
FIG. 2 is a schematic flow-chart illustration of a method of automatic financial-instrument-based (FI-based) management, in accordance with some demonstrative embodiments.

Reference is also made to FIG. 2, which schematically illustrates a method of automatic FI-based management, in accordance with some embodiments. In some embodiments, one or more of the operations of FIG. 2 may be performed by one or more elements of system 100 (FIG. 1), e.g., FI-based management application 160 (FIG. 1).

As indicated at block 204, the method may include receiving portfolio data corresponding to a plurality of FI portfolios associated with a plurality of clients. For example, FI-based management application 160 (FIG. 1) may receive portfolio data 172 (FIG. 1) corresponding to the plurality of clients.

As indicated at block 214, the method may include automatically identifying one or more portfolios of the plurality of portfolios satisfying at least one criterion. For example, FI-based management application 160 (FIG. 1) may automatically identify one or more portfolios of the plurality of portfolios satisfying the at least one criterion.

In some embodiments, the criterion may include a user-defined criterion.

In one example, as indicated at block 206 the method may include receiving parameters defining the criterion. For example, FI-based management application 160 (FIG. 1) may define the criterion based on one or more user-defined parameters, e.g., received via interface 112 (FIG. 1). The criterion may be defined, for example, by a salesperson, a trader, a management person, and the like.

As indicated at block 208, in some embodiments, the criterion may include, or may be based on, an event-based trigger, e.g., trigger 169 (FIG. 1). For example, in identifying the one or more portfolios FI-based management application 160 (FIG. 1) may automatically identify one or more of portfolios 172 (FIG. 1) including at least one financial instrument having an event satisfying a predefined event-based criterion, as indicated at block 216.

In one embodiment, the event-based criterion relates to at least one of an expiration of the financial instrument or a barrier of the financial instrument. In one example, trigger 169 (FIG. 1) may refer to financial instruments having an expiration date within less than a predefined time period, e.g., within a day, a week, and the like. In another example, trigger 169 (FIG. 1) may refer to financial instruments having a barrier, which is within a predefined range from a current market spot price of an underlying asset.

The event-based criterion may be defined, for example, by the user of device 102 (FIG. 1), e.g., via trigger interface tool 118 (FIG. 1). For example, the user of device 102 (FIG. 1) may define trigger 169 (FIG. 1), and FI-based management application 160 (FIG. 1) may automatically identify one or more portfolios satisfying trigger 169 (FIG. 1), e.g., as described below with reference to FIG. 3.

As indicated at block 210, in some embodiments, the criterion may relate to trade parameters defining a trade. For example, FI-based management application 160 (FIG. 1) may receive the parameters defining the trade, e.g., via interface 112 (FIG. 1); and, in identifying the one or more portfolios FI-based management application 160 (FIG. 1) may automatically identify one or more portfolios for recommending the trade based on the trade parameters, as indicated at block 218.

In one embodiment, the user of device 102 (FIG. 1) may provide FI-based management application 160 (FIG. 1) with trade parameters defining a trade, e.g., via interface 112 (FIG. 1); and FI-based management application 160 (FIG. 1) may automatically identify one or more portfolios to which the trade is to be offered based on the criterion related to the trade parameters, e.g., as described below with reference o FIG. 4.

Although some demonstrative embodiments are described herein with relation to a user-defined criterion defined by user 102 (FIG. 1), e.g., a salesperson, trader, manager, and the like, in other embodiments, the criterion may be defined, e.g., automatically, by any other suitable element of system 100 (FIG. 1). For example, FI-based management 160 may automatically define the criterion, e.g., based on information received from user 102 (FIG. 1), CRM modules 161 (FIG. 1) and/or FI systems 140 (FIG. 1). In another example, FI-based management application 160 may generate the criteria using predictive data 196 corresponding to a selected group of clients, for example, any suitable "pattern" data representing a behavioral pattern of the group of clients with respect to one or more FI trades, for example, a group of clients having in their portfolios one or more specific FIs, e.g., a EUR/USD option.

As indicated at block 212, the method may include receiving client-specific management data corresponding to a client associated with the identified portfolio. For example, FI-based management application 160 (FIG. 1) may receive, e.g., from CRM modules 161 (FIG. 1), suitable client-specific management data 175 (FIG. 1).

In some embodiments, client-specific management data 175 (FIG. 1) may include at least client-specific recipient and/or destination information ("destination information") 177 (FIG. 1) defining at least one destination to which information regarding the client or the portfolio of the client is to be communicated, for example, a sales person in charge of selling trades to the client, a trader in charge of performing and/or monitoring the trades, a manger, the client, a suitable system or service to process the information regarding the client or the portfolio of the client, a suitable database to store the information regarding the client or the portfolio of the client for later use, and/or any other suitable person or entity. For example, destination information 177 (FIG. 1) corresponding to a client may include any suitable information defining one or more ways of communicating with the destination, e.g., an E-mail address, phone number, instant messaging nickname, a postal address, and the like; and/or any suitable information defining the contents of the communication, e.g., a format of the communication, predefined data to be included in the communication, and the like. Client-specific management data 175 (FIG. 1) may also include any other suitable information corresponding to the client.

As indicated at block 224, the method may include, e.g., for each identified portfolio, automatically communicating portfolio-related data corresponding to the identified portfolio to the destination defined by the client-specific management data. For example, the FI-based management application 160 (FIG. 1) may automatically communicate to the destination defined by destination information 177 (FIG. 1) portfolio-related data corresponding to the identified portfolio.

In some embodiments, for example, if the criterion relates to an event, then the portfolio data may include at least information of the event in the identified portfolio.

In some embodiments, trigger 169 (FIG. 1) may refer to one or more events, e.g., as described above; and FI-based management application 160 (FIG. 1) may automatically identify one or more portfolios including one or more financial instruments satisfying the event defined by trigger 169 (FIG. 1); and automatically communicate to one or more destinations defined by destination information 177 (FIG. 1) of the clients associated with the identified portfolios, an alert regarding the events. According to these embodiments, FI-based management application 160 (FIG. 1) may automatically provide, for example, alerts to a sales person with respect to portfolios of clients managed by the salesperson. For example, trigger 169 (FIG. 1) may refer to financial instruments having an expiration date within less than one week. Based on trigger 169 (FIG. 1), FI-based management application 160 (FIG. 1) may automatically monitor portfolio data 172 (FIG. 1), for example, on a continuous basis, e.g., daily, to identify one or more portfolios having financial instruments expiring within a week. Upon identifying a portfolio, FI-based management application 160 (FIG. 1) may receive client-specific management date 175 (FIG. 1) corresponding to the client associated with the identified portfolio.

Destination information 177 (FIG. 1) of the received client-specific management date 175 (FIG. 1) may include communication details of a sales person in charge of the client. Based, on destination information 177 (FIG. 1), FI-based management application 160 (FIG. 1) may automatically communicate a suitable alert to the sales person, to alert the salesperson of the upcoming event in the identified portfolio. In one embodiment, FI-based management application 160 (FIG. 1) may automatically provide, e.g., on a daily basis or any other basis, a sales person with a suitable report or list of portfolios having the upcoming event. For example, at the beginning of every day, week, or month, FI-based management application 160 (FIG. 1) may automatically monitor portfolio data 172 (FIG. 1) and FI systems 140 (FIG. 1), e.g., based on triggers 169 (FIG. 1); and automatically provide a salesperson with a list of all events related to portfolios of clients managed by the salesperson.

As indicated at block 226, in some embodiments, the method may include automatically generating a client-specific trade article corresponding to the defined trade based on client-specific information corresponding to the client associated with the identified portfolio, for example, if the criterion relates to a trade, as described above. For example, FI-based management application 160 (FIG. 1) may automatically generate a client specific trade article based on client data 171 (FIG. 1), e.g., using FI service 199 (FIG. 1); and may communicate the client-specific trade article to the destination defined by the client-specific management data 175 (FIG. 1), e.g., as described below with reference to FIG. 4.

As indicated at block 220, in some embodiments the method may include automatically determining one or more recommended trades corresponding to a portfolio. For example, FI-based management application 160 (FIG. 1) may automatically determine one or more recommended trades to be offered to a client associated with a portfolio, e.g., based on client data 171 (FIG. 1), client profile 173 (FIG. 1), portfolio data 172 (FIG. 1), prediction data 196 (FIG. 1) and/or any other suitable data, e.g., received from FI systems 140 (FIG. 1) and/or CRM modules 161 (FIG. 1). FI-based management application 160 (FIG. 1) may automatically communicate, e.g., in accordance with the client-specific management information 175 (FIG. 1) corresponding to the client, recommendation information relating to the one or more recommended trades. The recommendation information may include, for example, one or more parameters defining the recommended trades, a trade article corresponding to the recommended trades, an analysis of the recommended trades, and the like.

In some embodiments, FI-based management application 160 (FIG. 1) may be capable of automatically generating a trade recommendation to replace an existing trade ("the replaced trade") in a client's portfolio; and/or automatically generating a trade recommendation to hedge and/or leverage the client's portfolio, e.g., as described below.

In some embodiments, application 160 (FIG. 1) may determine event-related triggers 169 (FIG. 1) for existing trades in a portfolio 172 (FIG. 1), e.g., as described herein. For example, application 160 (FIG. 1) may identify trades, which are close to maturity, options deep in the money, options close to knock out, and the like.

In some embodiments, application 160 (FIG. 1) may automatically generate a trade recommendation corresponding to an identified trade. For example, the recommendation may include closing the identified trade, e.g., if the trade included buying an option, then closing the trade may include selling the option, or if the trade included selling an option then closing the trade may include buying the option; and replacing the closed trade with another trade ("the replacement trade").

In one embodiment, the recommended replacement trade may include a trading-strategy similar to the replaced trade. For example, based on a spot price at inception, denoted S0, of an underlying asset of the replaced trade and a current spot price, denoted S1, of the underlying asset, application 160 (FIG. 1) may automatically select an option having a strike $K=A*K0*S1/S0$; and a trigger $T=B*T0*S1/S0$, wherein K0 denotes the strike of the replaced trade, T0 denotes the trigger of the replaced trade, an wherein the values of A and B may be set to the value of 1, or may depend of the remaining time to maturity.

In another embodiment, the recommended replacement trade may include a trading-strategy different from the trading-strategy of the replaced trade, e.g., to optimize the client's risk versus cost. In one example, application 160 (FIG. 1) may automatically select the strategy of the replacement trade from a predefined set of strategies based on any suitable criteria.

In one example, application 160 (FIG. 1) may automatically identify that the client portfolio includes a "deep in the money" option, which may be replaced with another option, e.g., while allowing the client to receive money for selling the identified option. For, example, the identified "deep in the money" option may include a Vanilla Call option with a strike price K and a maturity T, and the current spot may be S. application 160 (FIG. 1) may select a recommended trade to replace the identified option, e.g., from a plurality of pre-defined strategies, e.g., including at least the strategies described below.

A first alternative may include buying call options with strike $K=S*(1.02+T(years)/12)$, and selling a put option. Application 160 (FIG. 1) may automatically determine the strike of the put, such that the total price is zero. In this case the client will receive money for selling the original in the money call option.

A second alternative may include buying call options with strike $K=S*(1.02+T(years)/12)$ and a knock out trigger at $T=0.97*S0$; and selling a put option so that the price of the strategy is zero. Application 160 (FIG. 1) may automatically determine the strike of the put, such that the total price is zero. In this case the client will receive money for selling the original in the money call option.

A third alternative may include buying vanilla call options with strike $K=S*(1.02+T(years)/12)$; and selling a knock in put option with strike $K=S*(1.02+T(years)/12)$ and a trigger T, such that the price of the strategy is zero. Application 160 (FIG. 1) may automatically determine the knock in trigger of the put option, such that the total price is zero. In this case the client will receive money for selling the original in the money call option.

In some embodiments, application 160 (FIG. 1) may select between the predefined alternatives, e.g., based on the client profile 173 (FIG. 1) corresponding to the client and/or any other suitable criteria.

In one example, if the client profile 173 is such that the client only has a mandate to trade forward or structure forwards, then application 160 (FIG. 1) may recommend alternative 3 as it is a structured forward. If the trigger is touched it becomes a simple forward deal, and if the trigger is not touched then the client has no liability.

In another example, application 160 (FIG. 1) may select the recommended trade based on the maximum loss of the trade in a variety of scenarios. For example, the recommended trade may include the trade having the lowest maximum loss.

In some embodiments, application 160 (FIG. 1) may automatically generate a trade recommendation in response to a request from user 102 (FIG. 1). For example, user 102 (FIG. 1) may use interface 111 (FIG. 1) to define expected cash flows and/or other payments to be considered when defining a strategy of the recommendation. Application 160 (FIG. 1) may use the profile 173 (FIG. 1) corresponding to the client.

In one example, application 160 (FIG. 1) may analyze the change in the value of the portfolio 172 (FIG. 1) corresponding to the client versus changes in the value of the assets included in the portfolio, e.g., spot price of currencies and commodities, parallel shift of the yield curve in interest rates, and the like. For each asset, application 160 (FIG. 1) may select, e.g., based on the client profile 173 (FIG. 1), from one or more predefined strategies, e.g., similar to and/or different from the strategies described above. For example, a strategy may include N vanilla options that create similar changes in the value of the portfolio versus spot and have a maturity that is the average of all assets and exposure in the portfolio of that asset.

In another example, for each asset application 160 (FIG. 1) may divide the portfolio to expiration buckets, e.g., quarterly, and analyze each bucket separately. For example, application 160 (FIG. 1) may examine all cash flows in a specific quarter and summarize them to one effective cash flow, and then determine a strategy to hedge the summarized cash flow only. This example may include coupons from debt to pay/receive or any commodity/energy to be consumed/sold. Application 160 (FIG. 1) may offer a strategy that is composed of the selected strategies for all the buckets and the assets.

In another example, application 160 (FIG. 1) may analyze parameters, such as, for example, delta, gamma, vega, dvega/dvol, ddelta/dvol of the portfolio, either weighted by maturity or kept in separate buckets as described above; and design strategies that balance the parameters as close as possible to zero for the whole portfolio. In one example, application 160 (FIG. 1) may use a portfolio of vanilla options and solve for the strikes and volume per strike.

As indicated at block 230, in some embodiments the method may include automatically determining one or more client-specific parameters of the recommended trades to be offered to a client based on a client profile of the client. For example, as indicated at block 228, the method may include determining the client profile.

In some embodiments, FI-based management application 160 may automatically determine client-specific profile 173 corresponding to at least one client of the plurality of clients based on portfolio data 172 of one or more portfolios associated with client, e.g., as described below. FI-based management application 160 may automatically determine one or more client-specific parameters of the trade to be offered to the at least one client based on the client profile.

In some embodiments, the client specific parameters include a sales margin. The Sales margin ("mark-up") may define an addition or reduction that should be applied to a buy or a sell price proposed to a client for a specific trade, compared to a "reference price". The "reference price" may include a bank's best-offered price, and can be defined, for example, as the bank's internal transfer price between the trading and sales desk. A salesperson may want to maximize the aggregate margins charged on executed deals for a predefined period, e.g., three months, for example, by optimizing the charged sales-margin per deal. The salesperson may provide application 160 (FIG. 1) with trade-related parameters defining a trade, e.g., including the "reference price' for the trade. Application 160 (FIG. 1) may automatically determine a client-specific minimal margin for the trade based, for example, on one or more of the following client-specific parameters, which may be included, for example, as part of client profile 173 (FIG. 1), portfolio data 172 (FIG. 1) and/or client data 171 (FIG. 1):

time from first client interaction;
time from last client purchase;
general purchase history;
volume of deals (overall, past year);
client profitability (overall, past year);
client potential;
'hit ratio' (what percentage of offers he accepted);
overall support resources invested;
client investment/hedging goals;
special campaigns and promotions;
structure type;
structure strike price;
client's counterparty risk;
organization's profitability ranking;
any other parameter.

In some embodiments, application 160 (FIG. 1) may determine one or more of the client-specific parameters listed above, and based on the monitored parameters, application 160 (FIG. 1) may automatically adjust the sales-margin to be offered to the client, e.g., in real time.

In some embodiments, FI-based management application 160 (FIG. 1) may automatically combine CRM-related data, e.g., from CRM modules 161 (FIG. 1) and/or database 121 (FIG. 1), with FI data, e.g., from FI services 140 (FIG. 1) and/or database 121 (FIG. 1), for example, to infer trends. For example, FI-based management application 160 (FIG. 1) may automatically identify hedging activities across various subsets of clients and/or portfolios and discover patterns that relate to parameters such as, for example, underlying exposure, current holdings, risk appetite, client size, and the like. FI-based management application 160 may then provide customized sales and/or marketing recommendations as to the optimal hedging/investment offers to make to the clients based on those parameters. Cross-selling and/or up-selling may require for the company and its sales people to understand the relationship between different offerings, and know which purchase may lead to another one.

In some embodiments, the recommended trades may include at least one trade corresponding to a financial instrument already included in the identified portfolio. For example, if the identified portfolio includes an option on an underlying asset, which is close to expiration, then the recommended trades may include a new option on the same underlying asset and having a longer expiration period.

In some embodiments, the recommended trades may include at least one trade corresponding to a financial instrument to be added to the portfolio. In one example, FI-based management application 160 (FIG. 1) may automatically identify one or more portfolios, which do not hedge currency exposure and a corresponding interest-rate exposure. FI-based management application 160 (FIG. 1) may automatically determine the recommended trades to include a trade to hedge the unhedged exposure.

In some embodiments, determining the recommended trade may include hedging an exposure, as indicated at block 222.

In one example, the salesperson 102 (FIG. 1) may use FI-based management application 160 (FIG. 1) to effectively sell interest rates derivatives (IRD) structures for hedging. According to this example, the sales person may use interface 112 (FIG. 1) to query application 160 (FIG. 1) for all clients who have a live foreign-exchange (FX) hedge against a foreign currency, e.g., Euro (EUR), but do not have a hedge against a related EUR interest rate (IR) risk. Application 160 (FIG. 1) may automatically provide the salesperson with an IRD strategy for hedging the EUR interest rates exposure and/or provide the salesperson with a customized trade idea. For example, application 160 (FIG. 1) may automatically identify one or more portfolios which have not hedged none/one/two of their currency exposure and an interest rates exposure related to the currency exposure. Application 160 may automatically issue, e.g., for all portfolios having only hedged one of the exposure a client-specific trade-idea for the hedging of the unhedged exposure.

In another example, the sales person may use application 160 (FIG. 1) to query for all clients who currently have a 'live' vanilla option. Application 160 (FIG. 1) may automatically scan portfolio data 172, e.g., testing both the actual trade as well as meta-data, e.g., profile data 173, related to the purchase decision (e.g., what exposure they are hedging against). Application 160 (FIG. 1) may automatically determine a possible alternative exotic structure that would, for example, both provide a more effective solution for the client and at the same time grant the sales person and/or the bank with a higher profit margin.

As indicated at block 202, the method may include receiving real-time market data corresponding to the plurality of portfolios. For example, FI-based management application 160 (FIG. 1) may receive, e.g., from FI systems 140 (FIG. 1), real-time market data corresponding to the plurality of portfolios, and automatically identify the one or more portfolios based on the real-time market data. In one example, the real time data may include data relating to an underlying asset, e.g., a spot price of an underlying asset; and FI-based management application 160 (FIG. 1) may identify the portfolios based on the data relating to an underlying asset, e.g., by identifying one or more portfolios including one or more derivative instruments corresponding to the underlying asset having a knock-out or knock-in price within a predefined range from the spot price, e.g., based on trigger 169 (FIG. 1).

Figure 3:
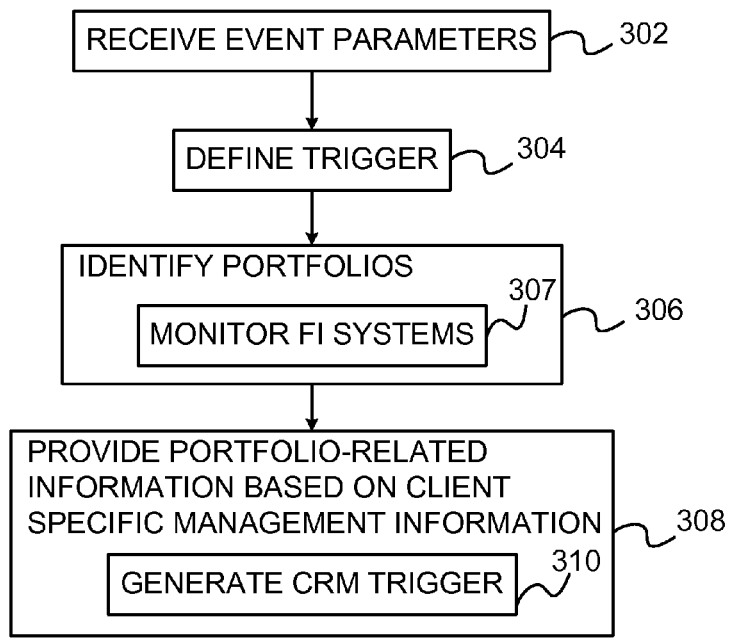
FIG. 3 is a schematic flow-chart illustration of a method of generating a FI-based trigger, in accordance with some demonstrative embodiments.

Reference is also made to FIG. 3, which schematically illustrates a method of generating a FI-based trigger, e.g., a FI-based CRM trigger, in accordance with some demonstrative embodiments. In some non-limiting embodiments one or more operations of the method of FIG. 3 may be performed by one or more elements of system 100 (FIG. 1), e.g., FI-based management application 160 (FIG. 1), to provide a user, e.g., users 102 (FIG. 1) API 193 (FIG. 1) and/or GW 194 (FIG. 1), with at least one FI-based trigger, e.g., trigger 169 (FIG. 1), based on an analysis of portfolio data 172 (FIG. 1) with relation to FI information received from one or more FI systems, e.g., systems 140 (FIG. 1), CRM information received from CRM modules 161 (FIG. 1), client data 171 (FIG. 1), client profile 173 (FIG. 1) and/or prediction data 196 (FIG. 1).

As indicated at block 302, the method may include receiving one or more event ("trigger") parameters. For example, the user may use tool 118 (FIG. 1) and/or user interface 111 (FIG. 1) to define one or more trigger parameters, which may be provided to application 160 (FIG. 1). For example, the event parameters may include a time distance from expiration date of a derivative instrument, a price distance between a knock in or knock out parameter of a derivative instrument and a spot price of an underlying asset, a hedging risk, a financial instrument type, a type of underlying asst, and the like.

As indicated at block 304, the method may include defining a trigger based on the event parameters. For example, application 160 (FIG. 1) may define trigger 169 (FIG. 1) based on the received event parameters.

As indicated at block 306, the method may also include identifying one or more portfolios including one or more financial instruments satisfying the defined trigger. As indicated at block 307, the method may include monitoring one or more of FI systems 140 (FIG. 1) and/or CRM modules 161 (FIG. 1) to detect FI and/or CRM information corresponding to the defined trigger. For example, application 160 (FIG. 1) may monitor systems 140 (FIG. 1) to detect information corresponding to trigger 169 (FIG. 1), e.g., based on the trigger parameters, client data 171 (FIG. 1), profile data 173 (FIG. 1), prediction data 196 (FIG. 1), and/or portfolio data 172 (FIG. 1), as described above. In one example, FI-based management application 160 (FIG. 1) may monitor FI systems 140 (FIG. 1) to determine spot prices of underlying assets corresponding to the portfolios of portfolio data 172 (FIG. 1), and identify one or more of the portfolios including one or more financial instruments satisfying trigger 169 (FIG. 1), e.g., including derivative instruments having a knock in or knock out price within the price distance, as defined by trigger 169 (FIG. 1), from the monitored spot price.

As indicated at block 308, the method may include providing portfolio-related information corresponding to the identified portfolio. For example, FI-based management application 160 (FIG. 1) may receive client-specific information 175 (FIG. 1) corresponding to a client associated with an identified portfolio, and to communicate to a destination defined by the client-specific information 175 (FIG. 1) portfolio-related information corresponding to the identified portfolio.

As indicated at block 310, the method may also include generating a CRM-based trigger corresponding to the one or more identified portfolios satisfying the parameters of the defined trigger. For example, application 160 (FIG. 1) may activate a CRM trigger of CRM modules 161 (FIG. 1), e.g., as described herein.

In one embodiment, FI-based management application 160 (FIG. 1) may automatically provide alerts to at least one sales person with respect to portfolios of clients managed by the salesperson. For example, an event-based trigger 169 (FIG. 1) may be defined with reference to one or more desired events relating to one or more financial instruments, for example, financial derivatives having an expiration date within less than one week. Based on event-based trigger 169 (FIG. 1), FI-based management application 160 (FIG. 1) may automatically monitor portfolio data 172 (FIG. 1), for example, on a continuous basis, e.g., daily, to identify one or more portfolios having financial instruments expiring within a week. Upon identifying such a portfolio, FI-based management application 160 (FIG. 1) may receive client-specific management date 175 (FIG. 1) corresponding to the client associated with the identified portfolio. Based, on destination information 177 (FIG. 1) corresponding to the client associated with the identified portfolio, FI-based management application 160 (FIG. 1) may automatically communicate a suitable alert to the salesperson, to alert the salesperson of the upcoming event in the identified portfolio. In one embodiment, FI-based management application 160 (FIG. 1) may automatically provide the salesperson with a suitable report or list of portfolios having the upcoming event, e.g., on a daily basis or any other basis.

In another example, application 160 (FIG. 1) may automatically provide alerts to at least one sales person with respect to a client managed by the salesperson regarding, for example, a financial instrument not currently included in the portfolio of the client or even if the client currently has no portfolio. For example, an event-based trigger 169 (FIG. 1) may be defined in association with a client with reference to a financial instrument, which is or is not included in the current portfolio of the client, for example, to alert the salesperson and/or client of a client-defined event in the financial instrument, e.g., that the EUR/USD exchange rate has crossed the value of 1.4.

In another example, the event-based trigger 169 (FIG. 1) may be defined with reference to one or more other desired events, e.g., derivative instruments having a knock-in or knock-out price within a predefined distance from a current spot price. Based on event-based trigger 169 (FIG. 1), FI-based management application 160 (FIG. 1) may automatically monitor portfolio data 172 (FIG. 1) and FI systems 140 (FIG. 1), for example, on a continuous basis, e.g., daily, to identify one or more portfolios having derivative instruments with a knock-in or knock-out price within the distance, as defined by the trigger 169 (FIG. 1), from the current spot price. Upon identifying such a portfolio, FI-based management application 160 (FIG. 1) may receive client-specific management date 175 (FIG. 1) corresponding to the client associated with the identified portfolio. Based, on destination information 177 (FIG. 1) corresponding to the client associated with the identified portfolio, FI-based management application 160 (FIG. 1) may automatically communicate a suitable alert to the salesperson, to alert the salesperson of the upcoming event in the identified portfolio. In one embodiment, FI-based management application 160 (FIG. 1) may automatically provide the sales person with a suitable report or list of portfolios based on the defined event, e.g., on a daily basis or any other basis.

Figure 4:
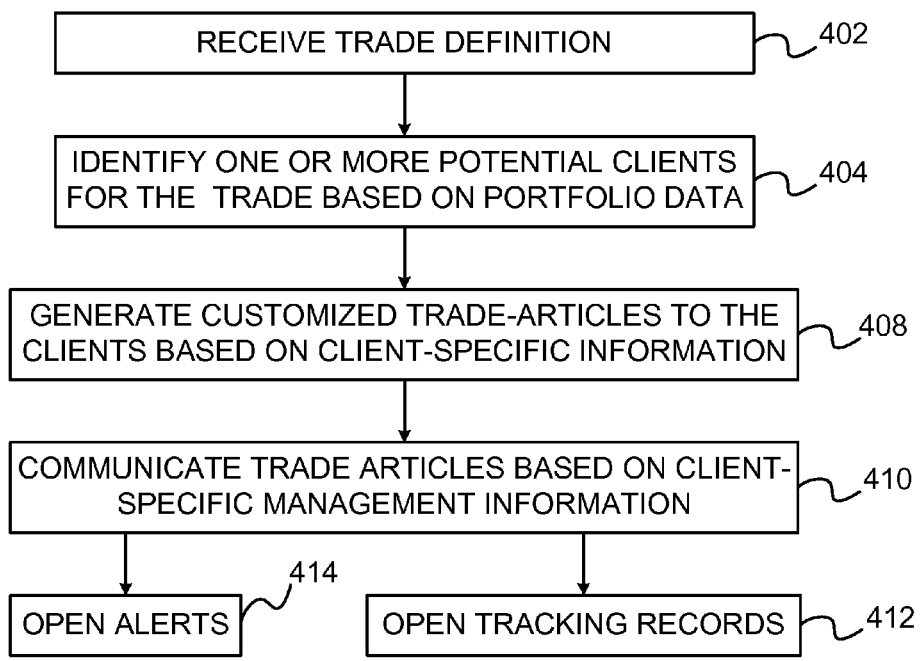
FIG. 4 is a schematic flow-chart illustration of a method of automatically recommending a trade based on portfolio data, in accordance with some demonstrative embodiments.

Reference is also made to FIG. 4, which schematically illustrates a method of automatically recommending a trade based on portfolio data, in accordance with some demonstrative embodiments. In some embodiments, one or more operations of the method of FIG. 4 may be performed by one or more elements of system 100 (FIG. 1), e.g., FI-based management application 160 (FIG. 1).

As indicated at block 402, the method may include receiving trade parameters defining a trade. For example, a trader may want to conduct with the bank's clients a certain volume, e.g., bounded by minimum and maximum, of a specific trade under specified terms, e.g., price level. The trade may be defined by the trader, for example, based on risk/opportunity analysis of the trader's portfolio. The trader may use interface 112 (FIG. 1) to provide application 160 (FIG. 1) with the trade parameters.

As indicated at block 404, the method may include identifying one or more potential clients for the trade based at least on portfolio data associated with the client. For example, application 160 (FIG. 1) may query for the clients who are most likely, e.g., above a threshold, to conduct the defined trade, e.g. based on portfolio data 172 (FIG. 1) and/or profile data 173 (FIG. 1), FI information from FI systems 140 (FIG. 1), CRM information from CRM modules 161 (FIG. 1), prediction data 196 (FIG. 1), and/or client data 171 (FIG. 1).

In some embodiments, FI-based management application 160 (FIG. 1) may identify the potential clients based on portfolio data 172 (FIG. 1) corresponding to each client and, optionally, one or more of the following, which may be included, for example, as part of client data 171 (FIG. 1) and/or client profile 173 (FIG. 1):

Client's investment goals;
Client's risk-tolerance profile;
Client's past transactions—quantitative (average size, number, overall notional, overall premium etc.);
Client's past transactions—type (asset class, instrument type, buy/sell, risk metrics etc.);
Proposals currently extended to the client;
Client's overall revenue;
Client's profitability;
Clients vertical industry;
Client's rate of response to similar offers;
Rate of response to similar offers—by clients "similar" to this one;
Client's exposures and hedging policy per asset type;
Expected deal events in the client's portfolio (e.g. expirations);
Counterparty overall exposure to the bank (including the proposed trade).

As indicated at block 408, the method may include generating a customized trade article corresponding to the proposed trade to be provided to the one or more identified clients, e.g., based on client-specific management information 175 (FIG. 1) and/or client data 171 (FIG. 1). For example, FI-based management application 160 (FIG. 1) may tailor the "generic" trade offer for each identified client in the form of a client-specific trade article, e.g., a term-sheet or trade idea, in the format preferred by the client, e.g., pdf, html, ppt, and the like.

As indicated at block 410, the method may include communicating the customized trade article based on client-specific destination information. For example, application 160 (FIG. 1) may automatically communicate the client-customized trade article to the client and/or a salesperson in charged of the client, e.g., based on destination information 177 (FIG. 1) corresponding to the client.

As indicated at block 412, in some embodiments the method may include opening a suitable CRM tracking record associated with the client to which the trade is recommended. For example, application 160 (FIG. 1) may automatically open a CRM "opportunity" record in CRM modules 161 to track the communication in a note within the CRM client record.

As indicated at block 414, in some embodiments the method may include generating one or more suitable CRM alerts, e.g., to remind a salesperson in charge of the client to follow up within a predefined time period, e.g., the next day. For example, application 160 (FIG. 1) may automatically generate the suitable CRM alerts for CRM modules 161.

In some embodiments, a report including details of the offered trades may be generated.

According to one example, a trader may want to write (sell) a large quantity of an option, e.g. 1,000,000,000 EUR notional amount of an option, e.g., to one or more clients. The option may include, for example, an option for buying a Call EUR/Put US dollar (USD), at a strike price (SP) of 1.400, and having a knock out trigger of 1.35, and an expiration date of 1 year from today (current spot price of EUR/USD is 1.4). Such Knock out option entitles the holder to buy an agreed amount (Notional) of EUR on expiry for 1.4 USD per EUR, provided the exchange rate never hits or crosses the barrier of 1.35. Such option may be cheaper, e.g., market price of 2.9% of the notional, than a plain vanilla option with the same strike of 1.4, which has a market price of 5.8% of the notional; the knock out option may provide a conditional protection against stronger EUR/weaker USD; and/or the knock out option may provide protection in a weaker EUR/stronger USD. On the other hand, such option may knock out, and the holder will lose his protection, which may still buy new protection at better prices; and/or the holder of the option has to pay a premium, which is paid up-front.

According to this example, application 160 (FIG. 1) may receive historical data relating to the EUR to USD exchange rate, e.g., over the past 3 years; and one or more of the following client-specific criterions relating to a potential client "A", e.g., based on client data 171 (FIG. 1), portfolio data 172 (FIG. 1), prediction data 196 (FIG. 1) and/or profile 173 corresponding to client "A":

| Criteria | Client "A" specific data |
| --- | --- |
| Client's exposures and hedging policy per asset type | Client is expected to be short EUR long USD by 100M EUR a year from now |
| Client's risk-tolerance profile | Client is risk averse, wants to keep his overall delta below a certain level and his Vega below a certain, e.g., different, level |
| Client's authorized trades | Forwards, Vanilla, Barrier |
| Client's past transactions - quantitative (average size, number, overall notional, overall premium etc.) | 10 deals over the past year, avg. 50 mil notional, 10K EUR premium. |
| Client's past transactions - type (asset class, instrument type, buy/sell, risk metrics etc.) | 9 vanilla, 1 barrier, all BUY |
| Client's overall revenue | 1.5B EUR/year |
| Client's profitability | 100M EUR |
| Clients vertical industry | Telecommunications |
| Client's rate of response to similar offers | 80% |
| Rate of response to similar offers - by clients "similar" to this one | 60% |
| Client's current portfolio - various analysis | The client holds 3 vanilla call options, 50M EUR each, expiring in 2, 3, 6 months, for strikes of 1.35, 1.4 and 1.45 |
| Expected deal events in the client's portfolio (e.g. expirations) | Expiries as above |
| Counterparty overall exposure to the bank (including the proposed trade) | None, as he only buys |
| Market Rates input | EUR/USD was between 1.249 and 1.59 over the past year. |

Based on analyzing the above inputs, application 160 (FIG. 1) may automatically determine, for example, that client A should be offered $100 million of the above knock-out option at a price of 3.5% (which may be slightly above the market). Application 160 (FIG. 1) may, for example, automatically generate a trade article customized to the preferences of client A, e.g., based on client-management information 175 (FIG. 1) corresponding to client A, and may automatically communicate the trade article to a salesperson in charge of the client, e.g., based on destination information 177 (FIG. 1) corresponding to the client.

Figure 5:
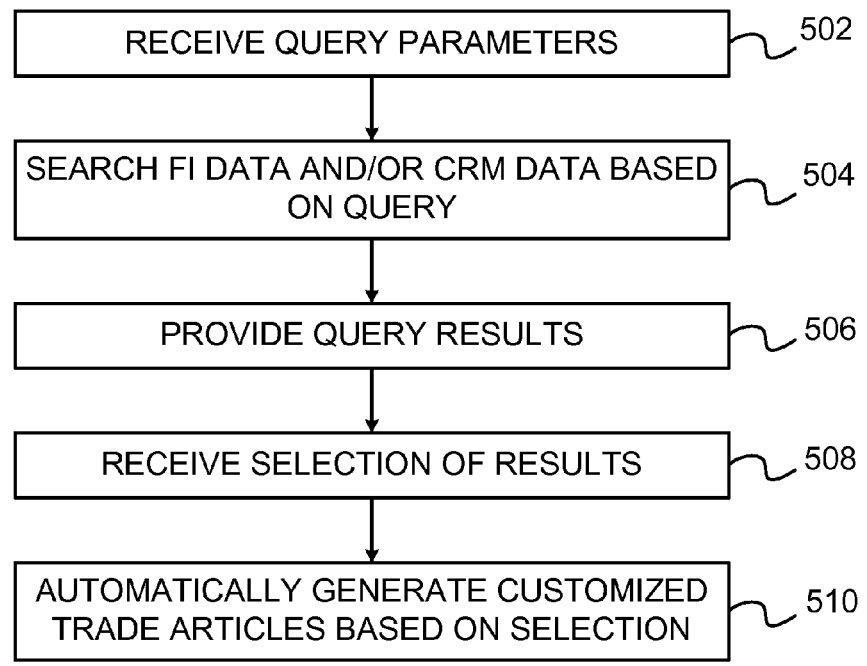
FIG. 5 is a schematic flow-chart illustration of a method of performing a FI-based query, in accordance with some demonstrative embodiments.

Reference is also made to FIG. 5, which schematically illustrates a method of performing a FI-based query in accordance with some demonstrative embodiments. In some non-limiting embodiments one or more operations of the method of FIG. 5 may be performed by one or more elements of system 100 (FIG. 1), e.g., FI-based management application 160 (FIG. 1), to query one or more FI systems, e.g., systems 140 (FIG. 1), CRM modules, e.g., CRM modules 160 (FIG. 1), and/or databases, e.g., database 121 (FIG. 1), for information requested by a user, e.g., user 102 (FIG. 1).

As indicated at block 502, the method may include receiving a query request from the user. For example, application 160 (FIG. 1) may receive a query request from user 102 (FIG. 1). For example, the user may use tool 117 (FIG. 1) and/or interface 111 (FIG. 1) to define one or more query parameters of the request, which may be provided to application 160 (FIG. 1), e.g., via interface 110 (FIG. 1). The query parameters may be based, for example, on client data 171 (FIG. 1), profiles 173 (FIG. 1), and/or portfolio data 172 (FIG. 1).

As indicated at block 504, the method may also include querying one or more of the FI systems 140 (FIG. 1), CRM modules 161 (FIG. 1), and/or database 121 (FIG. 1) to receive information based on the query request. For example, application 160 (FIG. 1) may query one or more of services 140 (FIG. 1) for FI information corresponding to the query request and/or database 121 (FIG. 1), e.g., to receive client data 171 (FIG. 1), profiles 173 (FIG. 1) and/or portfolio data 172 (FIG. 1) corresponding to the query request.

As indicated at block 506, the method may also include providing the queried information to the user. For example, application 160 (FIG. 1) may provide the queried information to the user, e.g., via interface 110 (FIG. 1). In addition, the query may be stored by system 100 (FIG. 1) for further use, for example, as part of prediction data 196 (FIG. 1) and/or profiles 173 (FIG. 1).

As indicated at block 508, the method may include receiving from the user a selection of one or more results of the query. For example, user 102 (FIG. 1) may use interface 110 (FIG. 1) to select one or more results of the query provided by application 160 (FIG. 1). For example, the salesperson may select, based on the query results, one or more clients, to which the salesperson would like to offer a new trade.

As indicated at block 510, the method may include automatically generating one or more customized trade articles based on the selection. For example, application 160 (FIG. 1) may automatically generate one or more customized trade articles, based on client-specific management information 175 (FIG. 1) and/or client data 171 (FIG. 1) corresponding to the selected clients.

In some embodiments, one or more operations of the method of FIG. 4 may be performed to allow a salesperson or sales manager to maximize the aggregate profits charged on executed deals for a pre-defined period, e.g., 3 months, through the retention and increase in average deal size of his "best clients". The salesperson may use interface 110 (FIG. 1) to instruct application 160 (FIG. 1) to rank the clients managed by the salesperson. The salesperson may then select a subset of one or more of the clients where he would like to invest more sales and support resources, promotions, and the like. Application 160 (FIG. 1) may rank the clients, for example, according to one or more of the following parameters, which may be included, for example, as part of client data 171 (FIG. 1) and/or client profile 173 (FIG. 1):

expected profits for next year based on holdings and exposures/targets;
counterparty exposure to the bank;
past year overall profitability (including trading-desk and sales desk impacts);
client's investment goals;
client's risk-tolerance profile;
client's exposures and hedging policy per asset type;
past year sales to the bank;
past year margins charged;
average deal size;
number of deals; and/or
any other suitable parameter.

Referring back to FIG. 1, in some embodiments, application 160 may automatically provide enhanced customer profitability analysis. For example, application may be able to complement and enhance traditional profitability assessment techniques with an analysis of current portfolio and exposures/targets of the client, e.g., as described herein.

In some embodiments, application 160 may automatically provide an analysis of customer "wallet share" and/or overall potential. For example, based on the investment potential and/or hedging needs of a client, the application 160 may estimate the business potential of the client for the bank vs. the actual conducted business. A difference may be accounted to competition and/or to sub-optimal activity from the customer's perspective.

In some embodiments, application 160 may automatically provide client-specific risk analysis. For example, application 160 may analyze various risk-profiles of a customer, e.g., counterparty exposure to the bank, market risk to the bank or market risk for the client. The analysis can be based on both current and past transactions and holdings, e.g., which may be received from FI services 140, CRM modules 161 and/or database 121, as described herein. This client-specific risk analysis may be relied on for marketing and/or sales activities and/or decisions, e.g., in a parallel and complementary manner to customer profitability analysis. For example, a company may provide some promotion to its top 10% clients in an index that combines, for example, past year profitability to the bank, expected profits for next year based on holdings and exposures/targets, and/or counterparty exposure to the bank.

In some embodiments, application 160 may automatically provide behavioral and/or competitive indications for offering one or more structures to one or more clients. For example, application 160 may generate a trigger alerting the salesperson to offer a client-specific financial product fitting a client profile 173 and/or transaction history of the client, e.g., as described herein. In one example, the client profile 173 may include a trade-hit ratio of the client, e.g., a ratio between a number of trades offered to the client and a number of trades, which were actually executed by the client. A low hit ratio may imply, for example, that the offers provided to the client were not suitable for the client and/or were too expensive for the client compared to other offers. Accordingly, application 160 may automatically determine a lower-cost or zero-cost hedge offer, or alternatively customized price of a trade, prior to offering the trade to the client. In another example, client profile data 173 may indicate that prior offers made to the client were too risky, and thus the next one should have a lower risk profile.

In some embodiments, application 160 may automatically provide portfolio restructuring for one or more portfolios, for example, by offering one or more new trades and/or modifying one or more trades included in a portfolio, e.g., as described herein. For example, application 160 may automatically alert the client and/or the salesperson in charge of the client with a possibility to better address the client's stated goals, e.g., taking into account bank considerations, by performing various trades (buying/selling). In one example, application 160 may identify a potential portfolio to be restructured based, for example, on original sub-optimal construction for the portfolio; a special price for an option, either specific to the financial institution, e.g. promotion or via the market; changes in market parameters, e.g. interest rate, underlying price, crossing of a pre-defined risk limit, e.g. too much Delta in the client's portfolio; predefined change in the underlying exposure, and/or changes in the coverage of the hedge; changes in client's goals and policies, e.g. a hedger that wishes to be better covered or an investor that seeks more profitability; a "Stop Order" for realizing a profit or limiting a loss by buying or selling options; availability of new offerings, e.g. specific structured product or entirely new option class, relevant to the client's goals and/or current portfolio; triggers based on new opportunities, changes in environment, and the like, which conform to the client's expressed "Indication Of Interest" (IOIs), for example the client may specify that he would like to be updated any time a new underlying asset, e.g., currency pair or stock, is supported for trading; current or highly possible "credit margin call" related to change in the client's portfolio value, e.g., growth in potential loss; overall position-keeping or risk-management consideration of the bank that may change the bank's willingness to continue the option contract with the client; various calendar events such as holidays, economic announcements or company announcements that may impact the underlying asset (or the option directly); and the like.

In some embodiments, application 160 may allow performing risk management position management based on CRM management. For example, a trader managing the overall risk of the position can take into account the completion-probability-weighted outstanding trade proposals. For example, if there have been 50 trade proposals for a client to buy 25 delta EUR/USD options on an aggregate notional of EUR 500 Million, and a weighted completion probability of 70%, the trader may take into account some of those deals when projecting his position. Obviously this weighted probability can be a heuristic combination of salesperson forecast, client purchase history, portfolio analysis, market trends and the like. As a result, the trader may possibly reduce his risk management costs or leverage interbank/client trading opportunities.

In some embodiments, application 160 may allow performing CRM management based on risk management position management. For example, position management needs or implications can be integrated into pipeline and opportunity management. In one example, when examining almost closed opportunities, e.g., 70-90% chance for successful closing, the risk management position management information may allow granting additional discounts, if needed, providing 'sweeteners', or otherwise influencing the sales process towards helping the salesperson close the sale.

In some embodiments, system 100 may provide value addition to the sales cycle, and customer retention rather than constructing a new customer base which is costlier and also an uncertain chase from business perspective. The basic philosophy behind CRM is that a company's relationship with the customer would be the biggest asset in the long run.

By using system 100, an enterprise can provide better customer service; increase customer revenues; discover new customers; cross sell/up sell products more effectively; help sales staff close deals faster; make call centers more efficient; and/or simplify marketing and sales processes.

The customer profile data gathered in application 160 and/or CRM modules 161, from name and address capture to the type of inquiry made, could be input from phone interaction, websites, emails, text chat, Voice over IP (VoIP), or even social networking systems, wikis, or blogs. The use of system 100 may form the crucial front-end of any e-business strategy. In today's fast-paced, competitive business environment it's more important than ever to create and maintain long-lasting business relationships.

The types of data, which may be collected and/or handled by application 160 and/or CRM modules 160 may include, for example, responses to campaigns; sales and purchase data; account information; web registration data; service and support records; demographic data; organizational: budget size, budget status (approved, pending, etc.), decision timeframe, location, and so on.

System 100 may benefit sales organizations, for example, by increasing the Close Ratio of the salespeople. Salespeople need only follow up on leads that meet a predefined threshold score. This reliable, objective lead-qualification system has various important positive effects on salespeople: they understand the process for qualifying leads, so they can trust it; they don't feel they're wasting time following up on leads, because leads are pre-qualified; and ultimately, they can increase their close ratio, because the percentage of viable deals entering the pipeline is higher.

Service 161 and/or CRM modules 161 may provide contact information, a history of prior interactions, related deals (such as with a different division in the same company) and other important data that help salespeople refresh their memories or get up-to-speed with a customer they've inherited from someone else.

While preparing for sales calls can take hours, service 161 and/or CRM modules 161 may significantly reduce this time. For example, at any stage of the sales process (however that may be defined by the organization), service 161 and/or CRM modules 161 may provide a list of specific resources, such as PowerPoint presentations, white papers, success stories and the like. These can be downloaded with a single click. Service 161 and/or CRM modules 161 may even be linked to online applications such as Google maps to provide single click driving directions.

Better lead qualification, better background information and better access to sales resources all genuinely help salespeople maximize their time, work more efficiently and close more deals. Rather than feeling at cross purposes with management, salespeople using service 161 and/or CRM modules 161 can feel that their goals and the goals of management are aligned.

Some salespeople are well organized. For others, organization is a challenge. Either way, service 161 and/or CRM modules 161 may provide salespeople quick access to existing information about accounts, provide convenient ways to collect and add new information, and let salespeople create and prioritize tasks to help them stay on track during busy days with constant interruptions.

In most businesses, crucial information about deals and customers—everything from contact phone numbers to invoicing data—is scattered over a variety of corporate database and back-end systems. Service 161 and/or CRM modules 161 may present the primary information salespeople need to work their deals in a clear, single-page format. For leads, to give one example, this includes basic contact information, company background (revenues, number of employees, etc.), associated accounts and information about the lead itself, including its source. Other relevant data, such as order histories from a back-end financial system, can be made available with a single click.

Service 161 and/or CRM modules 161 may allow the sales person to collect information relatively easy. Service 161 and/or CRM modules 161 may provide simple input forms, which may be customized to meet individual or group needs, and may be accessed by a variety of endpoint devices, e.g., devices 102, with or without requiring the user to be "online" to access these functions.

Service 161 and/or CRM modules 161 may include a CRM home page providing sales reps with a quick overview of everything they need to do, including scheduled meetings, tasks, e.g., created inside the system either by the rep or automatically, and alerts, which typically are sales department messages and notifications. To help salespeople make decisions on how to spend their time, tasks can be prioritized by due date or by the size of the associated deal.

Service 161 and/or CRM modules 161 may support the way salespeople work through integration with third-party applications. Many would argue that the most important ones are e-mail client-applications such as Microsoft Outlook, the first application that many people in business open every morning. Due to CRM/e-mail integration, users can read their e-mail and, when something related to leads or opportunities appears, transfer information to service 161 and/or CRM modules 161 without leaving Outlook. Moreover, the transfer method is simple drag and-drop, with no typing required. Service 161 and/or CRM modules 161 may also interact with Web-enabled back-office systems that previously might have required a separate login. This could provide, for example, a list of all the orders a customer has placed within a given time period. In addition to integration with software applications, service 161 and/or CRM modules 161 can also integrate with mobile devices, such as BlackBerry, Palm and Windows Mobile-based devices, so salespeople on the road can have a choice of access modes.

Service 161 and/or CRM modules 161 may provide important indirect benefits as well. For example, service 161 and/or CRM modules 161 may include a lead management process that, like the lead-evaluation process, operates objectively based on business rules that can ensure fairness, prevent favoritism and eliminate embarrassing mistakes, such as assigning the same lead to two different sales reps.

Service 161 and/or CRM modules 161 may also provide analytical capabilities. Service 161 and/or CRM modules 161 may provide a built-in data warehouse that can provide insights into historical trends. These insights don't affect salespeople's' day-to-day lives, but they enable a company to make better decisions in marketing, and even with new product development. These decisions ultimately affect salespeople's' pocketbooks. For example, if adjustments to lead-generation activities result in a higher percentage of qualified leads at the front end of the sales process, this ultimately will be reflected in higher sales volumes—and bigger commissions.

Service 161 and/or CRM modules 161 may cause the sales organization, as a whole, to be more successful and, as a result the company, e.g., a financial institute, may be more successful. The success of the company may translate into important personal benefits, such as job security and more attractive compensation packages Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid-state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of embodiments of the invention have been illustrated and described herein, many modifications, substitutions, changes, and equivalents may occur to those skilled in the art. It is, therefore, to be understood that the appended claims are intended to cover all such modifications and changes.

What is claimed is:

1. A system comprising:
a memory having stored thereon financial-instrument-based (FI-based) management instructions; and
a processor to execute the FI-based management instructions resulting in a FI-based management application,
wherein the FI-based management application is to receive portfolio data corresponding to a plurality of managed financial-instrument (FI) portfolios associated with a plurality of clients, and to receive real-time market data corresponding to the plurality of managed portfolios, and trade parameters defining a trade,
wherein the FI-based management application is to automatically identify, based on said portfolio data and said real-time market data, one or more portfolios of the plurality of portfolios satisfying at least one management criterion including a criterion related to the trade parameters,
wherein, for an identified portfolio, the FI-based management application is to receive client-specific management data corresponding to a client associated with the identified portfolio, wherein the client-specific management data includes at least client-specific destination information defining at least one destination,
wherein, the FI-based management application is to automatically generate a client-specific trade article corresponding to the trade based on client specific information corresponding to the client, and to automatically communicate portfolio-related data, including the client-specific trade article corresponding to the identified portfolio, to the destination defined by the client-specific management data.

2. The system of claim 1, wherein in identifying the one or more portfolios the FI-based management application is to automatically identify one or more portfolios including at least one financial instrument having at least one event satisfying a predefined event-based criterion.

3. The system of claim 2, wherein the portfolio data includes at least information of the event.

4. The system of claim 2, wherein the event-based criterion relates to at least one event selected from the group consisting of an expiration of the financial instrument and a barrier of the financial instrument.

5. The system of claim 1, wherein the FI-based management application is to determine one or more recommended trades corresponding to the identified portfolio, and wherein the portfolio-related data corresponding to the identified portfolio includes recommendation information relating to the one or more recommended trades.

6. The system of claim 5, wherein the recommended trades include at least one trade corresponding to a financial instrument included in the portfolio.

7. The system of claim 5, wherein the recommended trades include at least one trade corresponding to a financial instrument to be added to the portfolio.

8. The system of claim 5, wherein the FI-based management application is to identify one or more portfolios, which do not hedge currency exposure and a corresponding interest-rate exposure, and wherein the recommended trades include a trade to hedge the unhedged exposure.

9. The system of claim 1, wherein the FI-based management application is to automatically determine a client-specific profile corresponding to at least one client of the plurality of clients based on one or more portfolios of the plurality of portfolios associated with the at least one client, and wherein the FI-based management application is to automatically determine one or more client-specific parameters of a trade to be offered to the at least one client based on the client profile.

10. The system of claim 9, wherein the client specific parameters include a sales margin.

11. The system of claim 1, wherein the FI-based management application is to define the at least one management criterion based on one or more user-defined parameters.

12. A system comprising:
a memory having stored thereon financial-instrument-based management instructions; and
a processor to execute the financial-instrument-based (FI-based) management instructions resulting in a FI-based management application,
wherein the FI-based management application is to receive trade parameters defining at least one trade with respect to a financial instrument, client-specific data corresponding to a plurality of clients, and real-time market data corresponding to managed financial-instrument (FI) portfolios associated with said plurality of clients,
wherein the FI-based management application is to automatically identify at least one client of the plurality of clients and define at least one recommended client-specific trade to be offered to said at least one client of the plurality of clients, based on the trade parameters, the client-specific data corresponding to the client, and the real-time market data,
wherein the FI-based management application is to automatically generate a client-specific trade article corresponding to the recommended trade based on the client specific data corresponding to the client;
and wherein the FI-based management application is to automatically provide an output corresponding to the recommended client-specific transaction.

13. The system of claim 12, wherein the client-specific data corresponding to the client includes financial data corresponding to the client.

14. The system of claim 13, wherein the financial data includes at least one type of data selected from the group consisting of portfolio data corresponding to one or more portfolios associated with the client, and client profile data defining a financial-instrument related profile of the client.

15. The system of claim 12, wherein the FI-based management application is to receive client-specific management data corresponding to the client, wherein the client-specific management data includes at least client-specific destination information defining at least one destination, and wherein the FI-based management application is to automatically communicate recommendation information relating to the recommended trade to the destination defined by the client-specific management data.

16. The system of claim 15, wherein the FI-based management application is to automatically communicate the client-specific trade article to the destination defined by the client-specific management data.

17. A computer-based method comprising:
receiving by a computing device portfolio data corresponding to a plurality of managed financial-instrument (FI) portfolios associated with a plurality of clients, real-time market data corresponding to the plurality of managed portfolios, and trade parameters defining a trade;
automatically identifying by the computing device, based on said portfolio data and said real-time market data, one or more portfolios of the plurality of portfolios satisfying at least one management criterion including a criterion related to the trade parameters;
for an identified portfolio, receiving by the computing device client-specific management data corresponding to a client associated with the identified portfolio, wherein the client-specific management data includes at least client-specific destination information defining at least one destination;
automatically generating a client-specific trade article corresponding to the trade based on client specific information corresponding to the client; and
automatically communicating portfolio-related data, including the client-specific trade article corresponding to the identified portfolio, from the computing device to the destination defined by the client-specific management data.

18. The method of claim 17, wherein identifying the one or more portfolios includes automatically identifying one or more portfolios including at least one financial instrument having at least one event satisfying a predefined event-based criterion.

* * * * *